United States Patent
Sekiguchi et al.

[19]

[11] Patent Number: 6,138,419
[45] Date of Patent: *Oct. 31, 2000

[54] BUILDING PANEL OBTAINED BY RIVETING METHOD

[75] Inventors: Takamasa Sekiguchi; Tetsushi Matsumura, both of Tokyo; Kenjiro Komatsu, Kitakyushu; Yoshihiro Hase, Yokohama, all of Japan

[73] Assignee: Mitsubishi Chemical Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,093

[22] Filed: Jan. 29, 1997

Related U.S. Application Data

[63] Continuation of application No. 08/552,356, Nov. 2, 1995, abandoned.

[30] Foreign Application Priority Data

| Feb. 27, 1994 | [JP] | Japan | 7-063359 |
| Nov. 2, 1994 | [JP] | Japan | 6-293707 |
| Nov. 30, 1994 | [JP] | Japan | 6-321728 |
| Jul. 26, 1995 | [JP] | Japan | 7-210083 |
| Aug. 3, 1995 | [JP] | Japan | 7-218146 |

[51] Int. Cl.$^7$ .............................. E04H 1/00; B21D 47/00
[52] U.S. Cl. ......................... 52/235; 52/780; 29/525.13; 29/897.32
[58] Field of Search .................... 29/525.13, 525.15, 29/897.32, 525.06, 432.1, 524.1, 525.07; 52/235, 780

[56] References Cited

U.S. PATENT DOCUMENTS

| 1,876,624 | 9/1932 | Daughaday | 29/524.1 X |
| 1,947,839 | 2/1934 | Fissel | 29/525.07 X |
| 2,140,672 | 12/1938 | Gray et al. | 29/525.13 X |
| 2,618,400 | 11/1952 | Imhof | 29/432.1 |
| 2,697,873 | 12/1954 | Cooke, Jr. | 29/525.15 X |
| 2,753,624 | 7/1956 | Taylor | 29/524.1 |
| 3,164,283 | 1/1965 | Olson | 218/47 |

(List continued on next page.)

FOREIGN PATENT DOCUMENTS

| 1285427 | 1/1962 | France | 52/235 |
| 1042346 | 10/1958 | Germany | 29/897.32 |
| 53-15000 | 5/1978 | Japan . | |

OTHER PUBLICATIONS

Axiom Wall System, May. 1991.

*Primary Examiner*—David P. Bryant
*Attorney, Agent, or Firm*—Dike, Bronstein, Roberts & Cushman, LLP; David G. Conlin; William J. Daley, Jr.

[57] ABSTRACT

A riveting method comprises:
  adhesion-bonding a synthetic resin sheet 11 to a surface of a metal sheet 10 having a thickness of not more than 1 mm,
  adhesion-bonding a metal sheet 12 having a thickness of not more than 1 mm to a surface of the synthetic resin sheet 11,
  then stacking the metal sheet 12 and a metal plate or metal holding plate 2,
  forming a rivet hole from the surface of the metal plate or metal holding plate 2 to such a depth as reaching the synthetic resin sheet 11 but not penetrating the metal sheet 10,
  burying a mandrel-inserting type rivet in which a mandrel penetration aperture is formed from a head and through a shank of the rivet, and a mandrel having a mandrel head protruding out of the shank with the outer diameter of the head being more than the inner diameter of the penetration aperture is disposed through the penetration aperture in the rivet hole, and
  moving the head of the mandrel by an operation of drawing the mandrel, thereby diametrically enlarging the top end of the rivet shank.

35 Claims, 14 Drawing Sheets

U.S. PATENT DOCUMENTS

| | | | |
|---|---|---|---|
| 3,198,093 | 8/1965 | Kirby | 29/524.1 X |
| 3,232,162 | 2/1966 | Ketchum | 85/77 |
| 4,070,835 | 1/1978 | Reverend et al. | 52/235 |
| 4,138,779 | 2/1979 | Weber | 29/432.1 |
| 4,524,506 | 6/1985 | Wilke | 29/525.15 X |
| 4,766,663 | 8/1988 | Milam | 29/525.13 X |
| 4,840,004 | 6/1989 | Ting | 52/235 |
| 4,949,450 | 8/1990 | Scharres | 29/524.1 X |
| 5,083,405 | 1/1992 | Miller | 52/235 |
| 5,121,537 | 6/1992 | Matsui et al. | 29/524.1 X |
| 5,301,484 | 4/1994 | Jansson | 52/235 |
| 5,323,577 | 6/1994 | Whitmyer | 52/235 |
| 5,339,579 | 8/1994 | Woodyer et al. | 29/897.32 X |

BUILDING PANEL OBTAINED BY RIVETING METHOD

This application is a continuation of Ser. No. 08/552,356 filed on Nov. 2, 1995, now abandoned.

BACKGROUND OF THE INVENTION

The present invention relates to a riveting method and a building panel obtained by the riveting method.

A rivet is a clamping member having a head and a shank. Clamping by a usual rivet is performed by a method of forming a rivet hole to stacked metal plates by means of drilling or the like, inserting a rivet into the hole to protrude a shank, and applying a force (caulking) to the protruded shank to form a head at the end of the shank. Such rivet clamping has a merit, for example, of not requiring heating at high temperature for metal plates to be clamped.

However, since rivet heads are present on both surfaces of the clamped metal plates, the rivet can not always be said to be an appropriate clamping means when the surface of one of the metal plates is utilized as a decorative surface. Further, if one of the metal plates is thin, for example, having a thickness of not more than 1 mm, surface distortion is caused upon fabrication of the rivet hole or caulking operation, which is particularly disadvantageous, for example, in a case of conducting smooth coating on the decorative surface.

In view of the foregoing situations, as a result of the present inventors' various studies on the structure of a rivet, it have been found that upon clamping a metal sheet having a thickness of not more than 1 mm and a metal plate having a thickness of more than the thickness of the metal sheet, by using a specified rivet, and adhesion-bonding a synthetic resin sheet to the surface of the metal sheet having a thickness of not more than 1 mm, and adhesion-bonding a metal sheet having a thickness of not more than 1 mm on the surface of the synthetic resin sheet to function the synthetic resin sheet as a cushioning material, surface distortion of the metal sheet is prevented, the rivet end can be buried to the inside of the synthetic resin sheet, and the drawing strength of the rivet is improved remarkably by the metal sheet in contact with the other metal plate to be clamped although the sheet is thin. On the basis of the finding, the present invention has been attained.

SUMMARY OF THE INVENTION

An object of the present invention is to provide a riveting method for rivet-clamping a metal plate having a thickness of not more than 1 mm and a metal plate or metal holding plate having a thickness of more than the thickness of the metal plate, which is improved such that the surface distortion of the thin metal plate can be prevented, the rivet end is not exposed to the surface of the thin metal plate and both of the metal plates can be clamped at a sufficient strength.

Another object of the present invention is to provide a building panel in which a metal holding plate can be clamped firmly to a relatively thin composite plate having a thin metal sheet on the surface thereof, without exposing a rivet to a decorative surface, by applying the above-mentioned riveting method.

To accomplish the aims, in a first aspect of the present invention, there is provided a riveting method comprising:

adhesion-bonding a synthetic resin sheet to a surface of a metal sheet having a thickness of not more than 1 mm, adhesion-bonding a metal sheet having a thickness of not more than 1 mm to a surface of the synthetic resin sheet, stacking the metal sheet and a metal plate (or metal holding plate) having a thickness of more than the thickness of the Metal plate, forming a rivet hole from the surface of the thick metal plate (or metal holding plate) to such a depth as reaching the synthetic resin sheet but not penetrating the metal sheet, burying a mandrel-inserting type rivet in which a mandrel penetration aperture is formed from a head and through a shank of the rivet, and a mandrel having a mandrel head protruding out of the shank with the outer diameter of the head being more than the inner diameter of the penetration aperture is disposed through the penetration aperture in the rivet hole, and moving the head of the mandrel by an operation of drawing the mandrel, thereby diametrically enlarging the top end of the rivet shank.

In a second aspect of the present invention, there is provided a riveting method of clamping by a rivet a composite plate formed by adhesion-bonding metal sheets each having a thickness of not more than 1 mm on both surfaces of a synthetic resin sheet having a thickness of 1 to 10 mm and a metal plate (or metal holding plate), which method comprises:

using a mandrel-inserting type rivet in which a mandrel penetration aperture is formed from a head and through a shank of the rivet and a mandrel having a mandrel head protruding out of the shank with the outer diameter of the head being more than the inner diameter of the penetration aperture is disposed through the penetration aperture in the rivet hole, diametrically enlarging the top end of the rivet shank by a relative drawing movement of the rivet and the mandrel, bonding the composite plate and the metal plate (or metal holding plate) by means of a self-adhesive, a thermoplastic resin-based adhesive or an elastomer-based adhesive, forming a rivet hole formed from the surface of the metal plate (or metal holding plate), in which the rivet is buried with a predetermined distance being left between the head of the rivet and the metal plate (or metal holding plate), the rivet hole having such a depth as reaching the synthetic resin sheet but not penetrating the metal sheet on the side not joined with the metal plate (or metal holding plate), capable of diametrically enlarging the shank of the buried rivet in the synthetic resin and substantially equal with the total length of the shank to be enlarged diametrically and the head of the mandrel protruded therefrom, burying the rivet into the rivet hole in accordance with the above-mentioned manner, and then moving at least the rivet to the metal plate, thereby diametrically enlarging the top end of the rivet shank.

In a third aspect of the present invention, there is provided a building panel comprising a synthetic resin sheet adhesion-bonded between the metal sheets each having a thickness of 0.2 to 1 mm, a metal plate (or metal holding plate) is rivet-clamped to the surface of the metal sheet, and a head of a rivet is situated at the surface of the metal plate, the top end of the rivet shank being buried in the synthetic resin sheet.

In a fourth aspect of the present invention, there is provided a building panel comprising a panel member shaped into a quadrate planar configuration with a composite plate formed by laminating metal sheets on both surfaces of a synthetic resin sheet and holding plates as supports each attached in the vicinity of each of edges at a rear face of the panel member, in which the said holding plate comprises an engaging portion engaged to a wall surface of a building, a raising portion from the engaging portion and a joined portion secured to the rear face of the panel member, the said joined portion is joined to the panel member by way of an adhesion layer composed of a self-adhesive, a thermoplastic resin-based adhesive or an elastomer-based adhesive, and clamped by a rivet the top end of which is buried to the inside of the panel member.

In a fifth aspect of the present invention, there is provided a building panel comprising a panel member shaped into a quadrate planar configuration with a composite plate formed by laminating metal sheets on both surfaces of a synthetic resin core sheet and holding plates as supports each attached along each side edges at the rear face of the panel member, in which the said holding plate comprises an engaging portion engaged to a wall surface of a building, a leg raised from the engaging portion and a joined portion disposed to the upper end of the leg and secured to the rear face of the panel member, the said joined portion has, at a portion thereof, a bridge-shaped bent portion bulging in a direction apart from the panel member, and is clamped at the bent portion to the rear face of the panel member by a top end-buried type rivet.

In a sixth aspect of the present invention, there is provided a building panel comprising a panel member shaped into a quadrate planar configuration with a composite plate formed by laminating metal sheets on both surfaces of a honeycomb core composed of metal and holding plates as supports each attached along each of side edges at a rear face of the panel member and having a frame for covering a header of the panel member, in which the said header of the panel member is provided with a recessed shape to form a closed space with the frame of the holding plate, and a sealing material is filled in the said space.

DETAILED DESCRIPTION OF THE INVENTION

Figure 1:
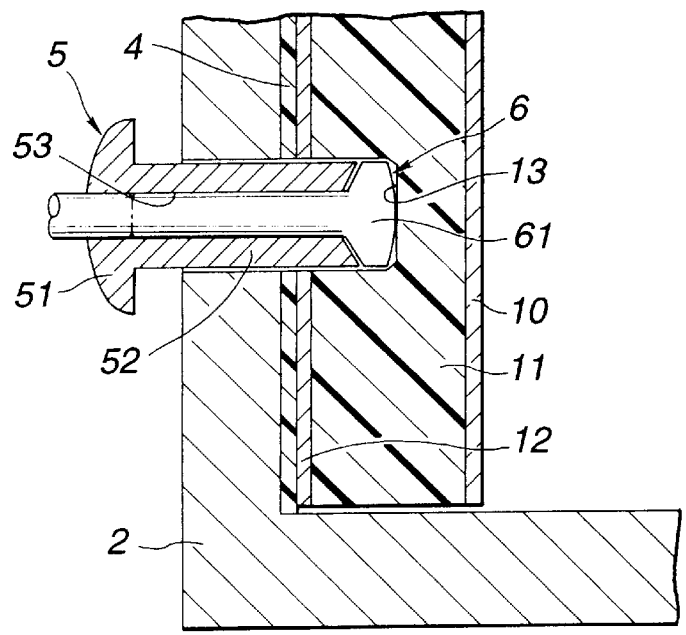
FIGS. 1 to 4 are explanatory views for steps showing an embodiment of a method according to the present invention.

Description will at first be made to each of materials used in the method according to the present invention.

As a metal constituting a metal sheet or a metal plate (metal holding plate), there can be cited metals such as aluminum, stainless steel, iron, copper, titanium and nickel or various kinds of alloys.

As a synthetic resin sheet, there can be cited, specifically, sheets of thermoplastic resins such as polyolefin, for example, polyethylene or polypropylene, polyvinylidene chloride, polyamide, polycarbonate, polystyrene, polyhydroxyl ether and vinyl acetate. Sheets of thermosetting resins such as an epoxy resin, a phenol resin, etc. may of course be used.

As the adhesive used for adhesion-bonding between the metal sheet and the synthetic resin sheet, there can be cited, for example, graft-modification products of ethylene-acrylic acid copolymer, ethylene-vinyl acetate copolymer, ethylene-glycidyl acrylate copolymer, ethylene-maleic acid anhydride copolymer or polyolefin (polyethylene or the like) with unsaturated carboxylic acids or anhydrides thereof. The grafting ratio of the unsaturated carboxylic acids or the anhydrides thereof in the graft-modification product is usually from $10^{-4}$ to 3% by weight. The graft-modification product can be used also as an adhesive composition blended with 1 to 30% by weight of a hydrocarbon elastomer, for example, ethylene-propylene rubber, polyisobutylene or the like. The adhesive is usually used being laminated as an adhesive film on the surface of a synthetic resin sheet but it may be used being blended with the synthetic resin sheet. In a case where the adhesive is used as the adhesive film, the thickness is usually selected from a range of 10 to 100 μm.

In the method according to the present invention, a composite plate, for example, "ALPOLIC" (trade name, manufactured by Mitsubishi Chemical Corp.) can be used suitably, which is formed by adhesion-bonding a synthetic resin sheet 11 to a surface of a metal sheet 10 having a thickness of 0.2 to 1 mm and adhesion-bonding a metal sheet 12 having a thickness of 0.2 to 1 mm to a surface of the synthetic resin sheet 11. The commercial product is a composite plate formed by adhesion-bonding metal sheets (for example, aluminum sheet) on both surfaces of a thermoplastic resin plate (for example, polyethylene plate), which is used generally in various kinds of fields including the field of building materials. The composite plate described above is manufactured by stacking metal sheets on both surfaces of a melt-extruded synthetic resin sheet and then passing then between rotational rolls.

Further, in a preferred embodiment according to the present invention, as the self-adhesive, the thermoplastic resin-based adhesive or elastomer-based adhesive used for the bonding of the metal plate or metal holding plate with the composite plate, the following materials can be mentioned.

As the self-adhesive, there can be mentioned, for example, a so-called rubber-based adhesives using a natural rubber or synthetic rubbers a substrate, or utilizing thermoplastic elastomer such as styrene-butadiene block copolymer or styrene-isoprene copolymer, a so-called acryl-based self-adhesive composed of acrylic acid ester copolymer as the main ingredient, a so-called silicone-based self-adhesive composed of silicone rubber and silicone resin as the main ingredient, and a so-called vinyl-based self-adhesive using vinyl ether polymer as the raw material.

Then, a self-adhesive tape prepared by coating, for example, an acryl-based or synthetic rubber-based self-adhesive on both surfaces of an acrylic resin tape and appending separatable papers on both surfaces thereof is preferably used. Particularly suitable is a both-face self-adhesive tape using an acrylic resin tape of completely closed-cell foams as a support. As the both-face self-adhesive tape, there can be mentioned, for example, "VHB" series (trade name, manufactured by Sumitomo Three M Corporation) under the product number of: "Y-4930" (0.64 mm in thickness), "Y-4920" (0.4 mm in thickness) and "Y-4914" (0.25 mm in thickness).

As the thermoplastic resin-based adhesive, there can be specifically mentioned various kinds of adhesives using, for example, vinyl acetate resin, vinyl chloride resin, ethylene-vinyl acetate resin, acrylic resin and cellulose, which may be a solvent evaporation-type, chemical reaction-type or hot melt-type. As the elastomer-based adhesive, there can be mentioned various kinds of adhesives using, for example, chloroprene rubber, nitrile rubber and styrene-butadiene block copolymer, which may be either a solvent evaporation-type or a hot melt-type.

The rivet is made of an appropriate material such as aluminum alloy, brass and stainless steel, while the mandrel is usually made of a spring material. The rivet used in the present invention is known. For instance, in Japanese Patent Publication No. 53-15000, a cartridge (tube) rivet comprising a plurality of rivets arranged in a row in a package is proposed.

Then, the explanation is to be made to a preferred embodiment of a method according to the present invention with reference to FIGS. 1 to 4.

At first, in the method according to the present invention, a synthetic resin sheet 11 is adhesion-bonded to a surface of a metal sheet 10 having a thickness of not more than 1 mm, and a metal sheet 12 having a thickness of not more than 1 mm is adhesion-bonded to a surface of the synthetic resin sheet 11. In the illustrated embodiment, the metal sheet 10 constitutes a surface of a building panel (decorative surface), while the metal plate 12 constitutes a support.

If the thickness of the metal sheet 10 is too large, the surface distortion as the subject of the present invention less occurs, failing to show the advantageous effect of the present invention. Further, if the thickness of the metal sheet 12 is too large, the effect of improving the drawing strength by the metal sheet 12 is saturated, which is not economical and hinders reduction of weight. If the metal sheet 12 is too thin, no effect for improving the drawing strength by the metal sheet 12 can be obtained. The lower limit for the thickness of the metal sheets 10 and 12 is usually about 0.2 mm.

It is advantageous to select the thickness of the metal sheets 10 and 12 within the range of 0.2 to 1 mm as described above also with the following reasons. That is, in a case of adhesion-bonding the synthetic resin sheet 11 to the surface of the metal sheet 10 and adhesion-bonding the metal sheet 12 to the surface of the synthetic resin sheet 11, since the cross sectional secondary moment is determined in proportion with the fourth power for the total sheet thickness, it is more advantageous for obtaining required entire thickness by increasing the thickness of the synthetic resin sheet 11 rather than increasing the thickness of the metal sheets 10 and 12 as the surface material (for example, to a value exceeding 1 mm), with a view point of ensuring rigid strength. Further, also in a case of treating the surface of the metal sheet 10 and/or 12 by using a coil coating method with industrial advantage, the thickness has to be within the above-mentioned range by the restriction in view of the apparatus.

The thickness of the synthetic resin sheet 11 is preferably selected within the range from 1 to 10 mm. If the thickness of the synthetic resin sheet 11 is less than the above-mentioned range, cushioning effect is insufficient upon fabrication of a rivet hole or caulking operation, prevention for the surface distortion of the metal sheet 10 is insufficient, and it becomes difficult to bury a rivet end at the inside. If the thickness of the synthetic resin sheet 11 exceeds the above-mentioned range, the cushioning effect is saturated, which is not only economical but also hinders reduction of weight.

In the present invention, it is preferred to use a composite plate comprising a synthetic resin sheet 11 of 1 to 10 mm in thickness and metal sheets 10 and 12 each having a thickness of not more than 1 mm which are adhesion-bonded on both surfaces of the resin sheet, for example, "ALPOLIC" (trade name, manufactured by Mitsubishi Chemical Corp.).

Then, in the present invention, the composite plate and the metal plate are bonded by the self-adhesive, the thermoplastic resin-based adhesive or elastomer-based adhesive prior to the riveting operation. That is, the metal sheet 12 and the metal plate (metal holding plate) D are bonded. In the drawing, reference numeral 4 typically represents the self-adhesive layer. The self-adhesive is also called as a pressure sensitive adhesive, which is a sort of adhesives and used as a primary adhesive, different from a thermosetting resin-based adhesive used for permanent adhesion due to high adhesion strength.

In the present invention, the composite plate and the metal plate are bonded by means of the self-adhesive, the thermoplastic resin-based adhesive or elastomer-based adhesive by the following reasons. Namely, in a case of a riveting product in which the composite plate and the metal plate are not adhesion-bonded, since the metal sheet of the composite plate and the metal plate are not integrated over a wide area, the metal sheet itself does not exhibit a large resistive force to drawing, the metal sheet in contact with the metal plate deforms and, finally, the rivet is drawn from the rivet hole.

On the contrary, in a riveting product in which the composite plate and the metal plate are adhesion-bonded, the metal plate itself exhibits a large resistivity force to drawing and inhibits the deformation of the metal sheet in contact with the metal plate. As a result, the present invention can provide a riveting product having high drawing strength of the rivet.

Further, in the present invention, the self-adhesive, the thermoplastic resin-based or elastomer-based adhesive is used by the following reasons. That is, the self-adhesive, the thermoplastic resin-based or elastomer-based adhesive has a feature of low adhesion strength but having elasticity, compared with the thermosetting resin type adhesive using, for example, urea resin, melamine resin, phenol resin and epoxy resin. Accordingly, the self-adhesive or the like described above is advantageous, by its cushioning effect, for preventing the surface distortion of the metal sheet which may possibly occur upon fabrication of the rivet hole or caulking operation.

Furthermore, use of the self-adhesive or the like has a great merit, particularly, in a case of a composite plate comprising a synthetic resin sheet and metal sheets adhesion-bonded on both surfaces of the resin sheet. That is, since the composite plate is manufactured, as described above, by adhesion-bonding metal sheets at a low temperature on both surfaces of the heat-melted synthetic resin sheet, internal stresses remain in the synthetic resin sheet. Then, such internal stresses are balanced by the metal sheets bonded on the both surfaces to maintain the flatness of the composite plate. Accordingly, in a case of using a thermosetting resin-based adhesive causing reaction cure, balance of the internal stresses is lost by the shrinking force to deteriorate the flatness of the composite plate. On the contrary, the self-adhesive or the like, having the cushioning effect, does not deteriorate the flatness of the composite plate.

In the present invention, it is preferred to use a self-adhesive tape for the self-adhesive layer 4 with a view point of handling.

A mandrel-inserting type rivet used in the riveting method shown in FIGS. 1–4 has a structure in which a mandrel penetration aperture 53 is formed from a rivet head 51 through a rivet shank 52, a mandrel 6 is penetrated through the penetration aperture, the outer diameter of a mandrel head 61 protruding out of the rivet shank 52 is made larger than the inner diameter of the mandrel penetration aperture 53, and the rivet shank 52 is diametrically enlarged to divide the top end into plurality. Then, fingers 54 are formed by the division. The number of the fingers 54 has no particular restriction and it is appropriately from 4 to 8.

The divisional structure can be obtained by a method of using a rivet 5 having a recess of an appropriate shape disposed to the inner wall at the top end of the rivet shank 52, a method of using a rivet 5 having slits formed in parallel with an axial line along the inner wall at the top end of the rivet shank 52, a method of using a mandrel 6 having a cutting blade at a mandrel head 61, or a method of properly combining the said methods.

Then, in the present invention, a rivet hole 13 is formed from the surface of the metal plate 2 to such a depth as reaching the synthetic resin sheet 11 but not penetrating the metal sheet 10 not bonded with the metal plate 2 and the rivet 5 is embedded (refer to FIG. 1). In this case, the thickness of the synthetic resin sheet 11 left at the bottom of the rivet hole 13, although varying depending on the entire thickness of the synthetic resin sheet 11, is selected usually within a range from 10 to 50% thereof, and preferably, about 0.3 to 1.5 mm as a concrete value. Accordingly, the entire thickness of the synthetic resin sheet 11 is preferably determined so as to satisfy the above-mentioned condition. Further, from the same view point as described above, the maximum value for the inner diameter of the rivet hole 13 and the outer diameter for the rivet shank 52 is preferably about 5 mm.

However, it is preferred to increase the ratio of the synthetic resin sheet 11 left at the bottom of the rivet hole 13 as much as possible within the above-mentioned range, so that the rivet hole 13 formed is shallow as illustrated in the drawing in relation with the buried rivet 5.

In the embodiment for the method of forming the shallow hole, the rivet hole 13 is formed to such a depth as the rivet 5 is buried with a predetermined distance being left between the head 51 and the metal plate 2, to such a depth as capable of diametrically enlarging the buried rivet shaft 52 in the synthetic resin sheet 11, and to such a depth substantially equal with the total length of the shaft to be diametrically enlarged and the mandrel head 61 protruding therefrom.

The shallow rivet hole 13 described above is formed by the following reasons. That is, in a case of a deep rivet hole, since a space is present at the top end of a mandrel head 61, the synthetic resin which is forcively extended by the increase of the diameter escapes into the space upon diametrical enlargement of the top end of the rivet shank 52, thereby providing no sufficient anchoring effect by the diametrically enlarged portion. That is, the space forms an escape margin for the matrix, thereby making the matrix surrounding the diametrically enlarged portion loose. On the other hand, in a case of the shallow rivet hole 13, since the synthetic resin extended forcively by the diametrical enlargement has no escaping margin, the matrix surrounding the diametrically enlarged portion is not loosened so that the diametrically enlarged portion can provide a sufficient anchoring effect. Further, the synthetic resin left by the formation of the shallow rivet hole 13 is also effective, by its cushioning effect, to prevent the surface distortion of the metal sheet 10 which may possibly occur upon fabrication of the rivet hole or the caulking operation.

The rivet hole 13 should have such a depth as capable of diametrically enlarging the buried rivet shaft 52 in the synthetic resin sheet 11, and usually a shallow rivet hole 13 is formed preferably within a range of not more than about 50% based on the thickness of the synthetic resin sheet 11. Accordingly, the dimensional relationship for the rivet 5 is properly determined considering the thickness for each of the metal plate 2, the metal sheet 12 and the synthetic resin sheet 11. The maximum value for the inner diameter of the rivet hole 13 and the rivet shank 52 is about 5 mm.

Figure 2:
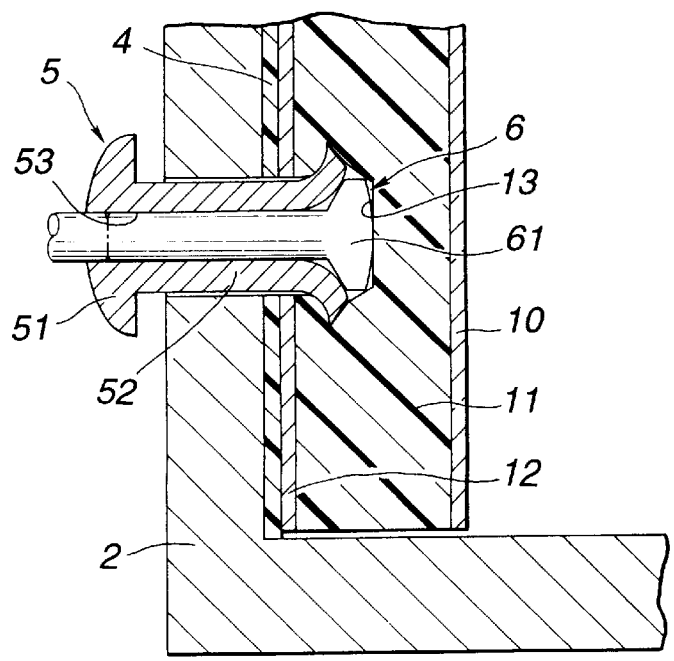
Figure 3:
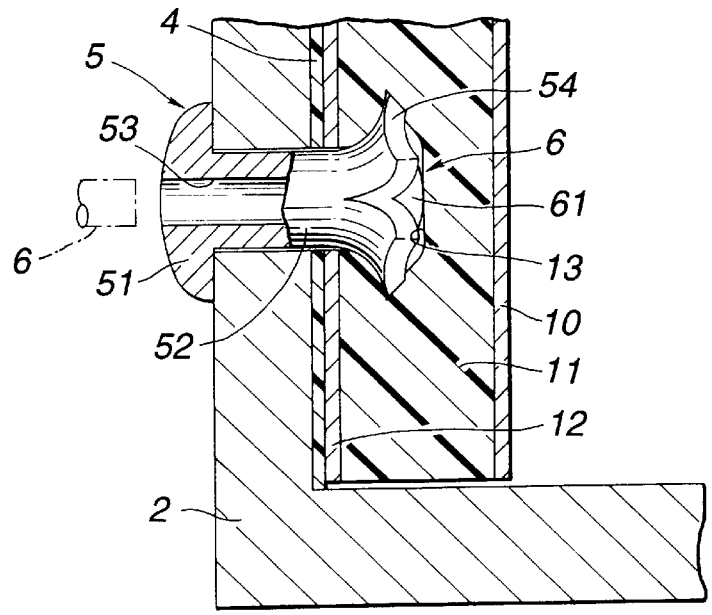

Then, in the present invention, as shown in FIGS. 2 and 3, at least the rivet 5 is moved toward the metal plate 2, thereby diametrically enlarging the top end of the rivet shank 52. In the present invention, upon burying the rivet 5 in the rivet hole 13, a predetermined distance is left between the rivet head 51 and the metal plate 2, and at least the rivet 5 is moved toward the metal plate 2 by the following reasons. That is, in the present invention, the rivet hole 13 is formed shallow as described above. Accordingly, the force of moving the rivet 5 toward the metal plate 2 exerts in the direction perpendicular of the rivet 5 and not in the moving direction of the rivet 5, and as a result, the matrix in the diametrically enlarged portion of the rivet shaft 52 is compressed to obtain more stronger anchoring effect. A preferred distance between the rivet head 51 and the metal plate 2, although varying depending on the dimensional relationship of the rivet 5, is usually about 2 to 4 mm. Then, a metal or resin washer may be disposed to the rivet head 51. The moving distance of the rivet head 51 is preferably within the above-mentioned range while considering the thickness of the washer.

Movement of the rivet 5 can be conducted by utilizing appropriate means used for the operation of drawing the mandrel 6. For instance, it can be conducted by properly securing an air tool (manufactured by Nippon Drive It Co., not illustrated) and exerting reaction caused by the drawing force of the mandrel 6 to the rivet head 51.

Figure 4:
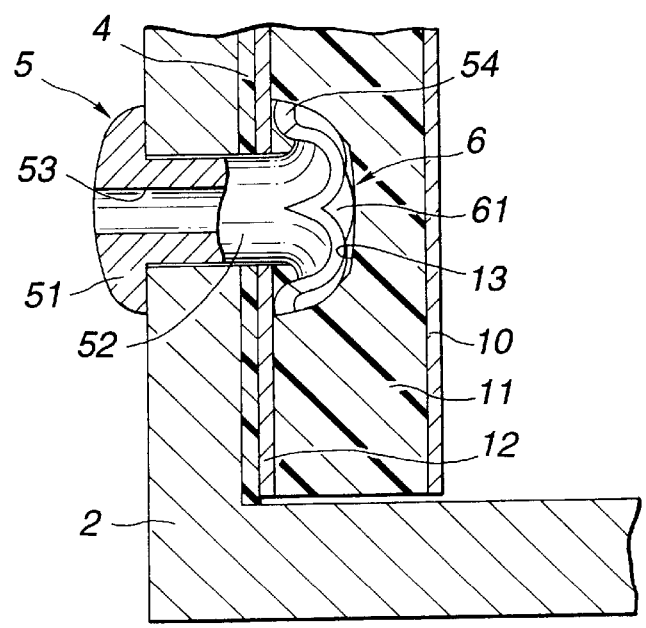

By the movement of the rivet 5, the rivet shank 52 is diametrically enlarged as shown in FIG. 3. This diametrically enlarges the top end of the rivet shank 52 to divide the top end into plurality to form fingers 54 (refer to FIG. 3). As a result, an anchoring effect by the fingers 54 is obtained. The rivet shank 52 is diametrically enlarged preferably till the bent top ends of the fingers 54 abut against the inner surface of the metal sheet 12 on the side of forming the rivet hole as shown in FIG. 4. The fingers 54 abutting against the inner surface of the metal sheet 12 also function as the head. Then, the metal sheet integrated with the metal plate 2 by the self-adhesive layer 4 provides a large resistive force to the drawing of the rivet although the thickness thereof is not more than 1 mm.

In the riveting method shown in FIGS. 1–4, the drawing is stopped at a stage in which the fingers 54 are formed sufficiently, and the mandrel 6 is cut near the protruded portion of the rivet head 51 to remain the mandrel as a stem in the rivet 5. Cutting can be applied easily by using a mandrel 6 having recesses on the circumferential surface at a predetermined position for cutting.

Figure 5:
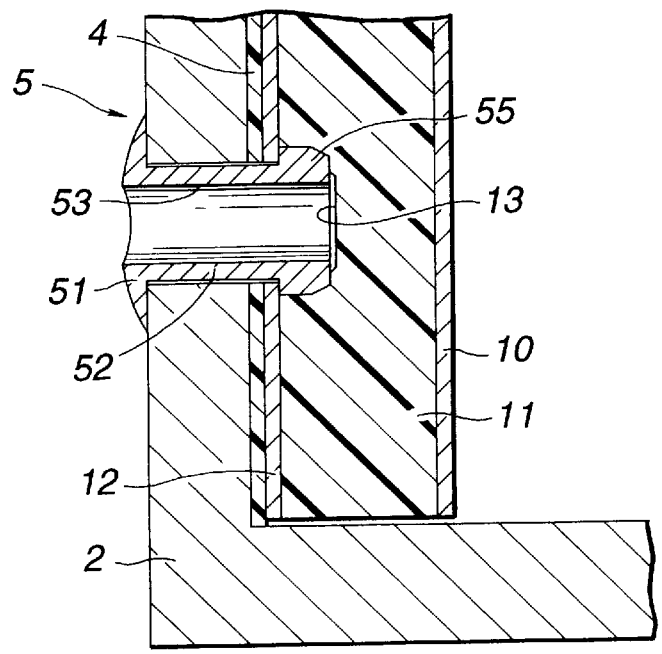
FIG. 5 is an explanatory view showing another embodiment of the method according to the present invention.
Figure 6:
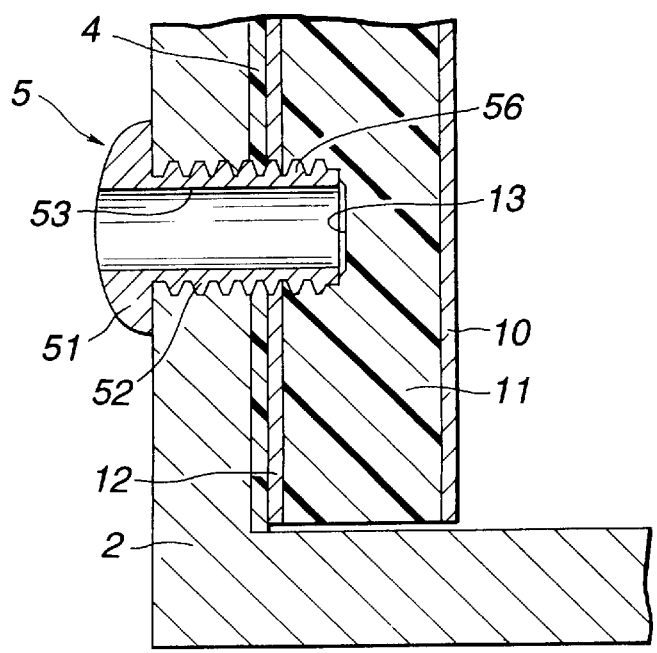
FIG. 6 is an explanatory view showing a further embodiment of the method according to the present invention.

In the present invention, a mandrel-inserting type rivet of a shape shown in FIGS. 5 and 6 can also be used in addition to the mandrel-inserting type rivet described previously. The mandrel-inserting type rivet shown in FIG. 5 has such a structure in which a mandrel penetration hole 53 is penetrated from a rivet head 51 through a rivet shank 52, a mandrel 6 is disposed throughout the penetration hole and the outer diameter of the mandrel head 61 protruding out of the rivet shank 52 is made larger than the inner diameter of the mandrel penetration hole 53. Then, in the same manner as described above, the rivet shank is diametrically enlarged by the movement of the rivet to form a rivet head 55.

On the other hand, a mandrel-inserting type rivet shown in FIG. 6 has such a structure substantially equal with the mandrel-inserting type rivet shown in FIG. 5, in which ribs 56 are formed on the circumference of the rivet shank 52. Ribs 56 bite into the wall surface of the rivet hole 13 by the diametrical enlargement of the top end of the river shank 52 to provide the anchoring effect. Further, the diametrically enlarged ribs 56 also function as the head. In the illustrated embodiment, the ribs 56 are disposed over the entire rivet shank 52, but this is not always necessary. Further, in the same manner as the rivet 5 shown in FIG. 5, the diameter at the top end of the rivet shank 52 is made large to form a large head 55 at the end of the rivet shank 52 as shown in FIG. 5.

In the mandrel-inserting type rivet of the shape shown in FIGS. 5 and 6, the mandrel 6 is usually drawn completely from the rivet 5 as illustrated, but the mandrel may be cut near the rivet head 51 and left in the rivet 5. Further, in the use of the rivet of any of the types described above, adhesive may be coated on the wall surface of the rivet hole 13 upon burying the rivet 5 into the rivet hole 13. This can attain a further firm clamping structure.

The mandrel-inserting type rivet used in the riveting method shown in FIGS. 1–4 is improved with the drawing strength by so much as the biting depth of the fingers 54 into the synthetic resin sheet 11. By the way, in the riveting method shown in FIGS. 1–4, a drawing strength of 105–120 KgF/rivet can be attained.

A building panel according to the present invention obtained by the above-mentioned method has such as structure that the synthetic resin sheet 11 is adhesive-bonded between the metal sheets 10 and 12 each of 0.2 to 1 mm thickness, the metal plate 2 is rivet-clamped to the surface of the metal sheet 11, the head 51 of the rivet 5 situates at the surface of the metal plate 2, and the top end of the shank 52 of the rivet 5 is buried in the synthetic resin sheet 11.

The building panel obtained by the method according to the present invention is used, for example, as an outer wall material. Since no surface distortion is present on the surface of the metal sheet 10 and the rivet shank 52 is buried in the synthetic resin sheet 11, the surface of the metal sheet 10 (decorative surface) forms a completely smooth surface. Then, a sufficient drawing strength is provided by the metal sheet 12 having a thickness of not more than 1 mm.

Figure 7:
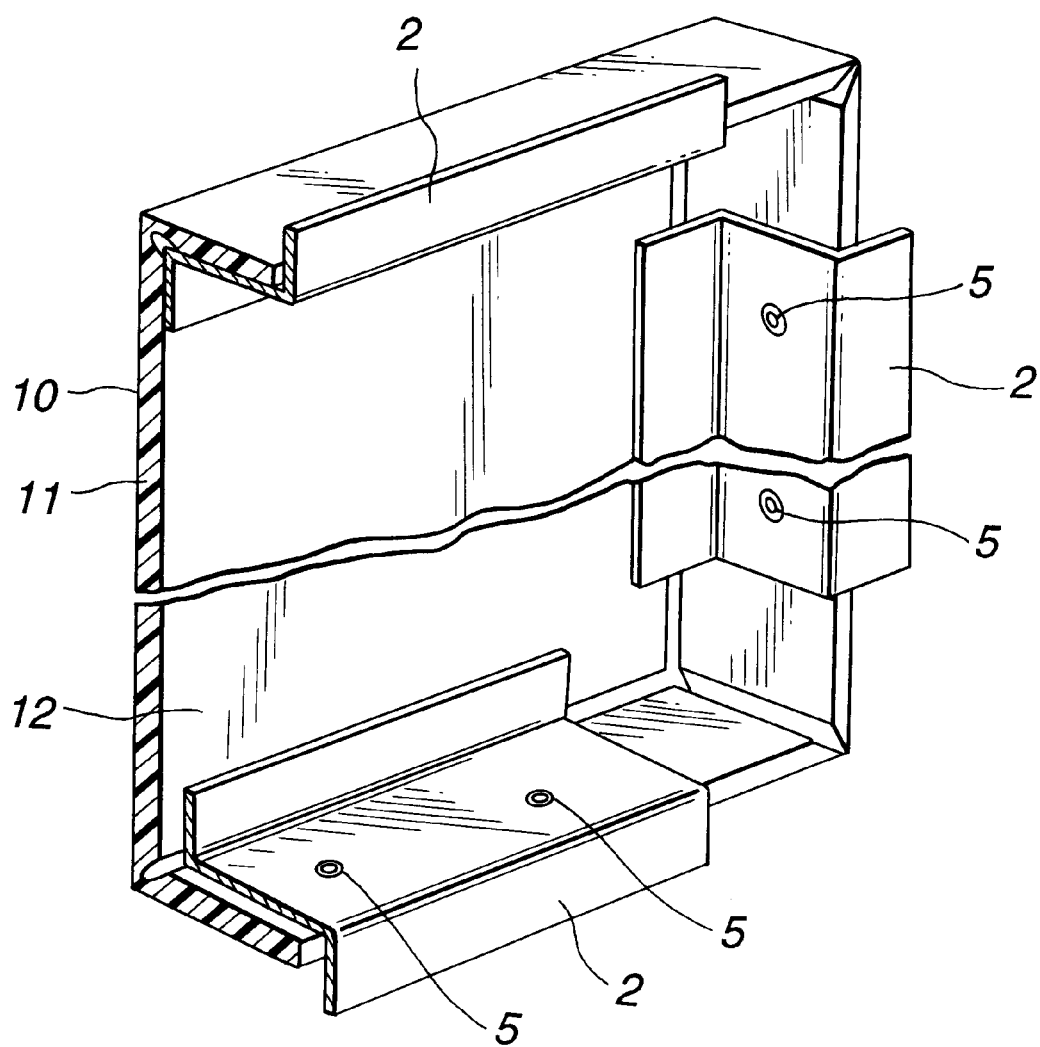
FIG. 7 is an explanatory view for an embodiment of a building panel according to the present invention.

A building panel according to the present invention shown in FIG. 7 is obtained by adhesion-bonding a synthetic resin sheet 11 to the surface of a metal sheet 10 having a thickness of 0.2 to 1 mm, adhesion-bonding a metal sheet 12 having a thickness of 0.2 to 1 mm to the surface of the synthetic resin sheet 11 to form a composite plate, forming side walls by applying bending fabrication to the periphery of the composite plate, and then riveting a metal plate 2 to the side wall.

The building panel described above is excellent in the mass, weather resistance and workability, and is used suitably mainly to building panels referred to as an exterior panel and an interior panel of buildings.

Building panels of other embodiments will be further explained.

Figure 8:
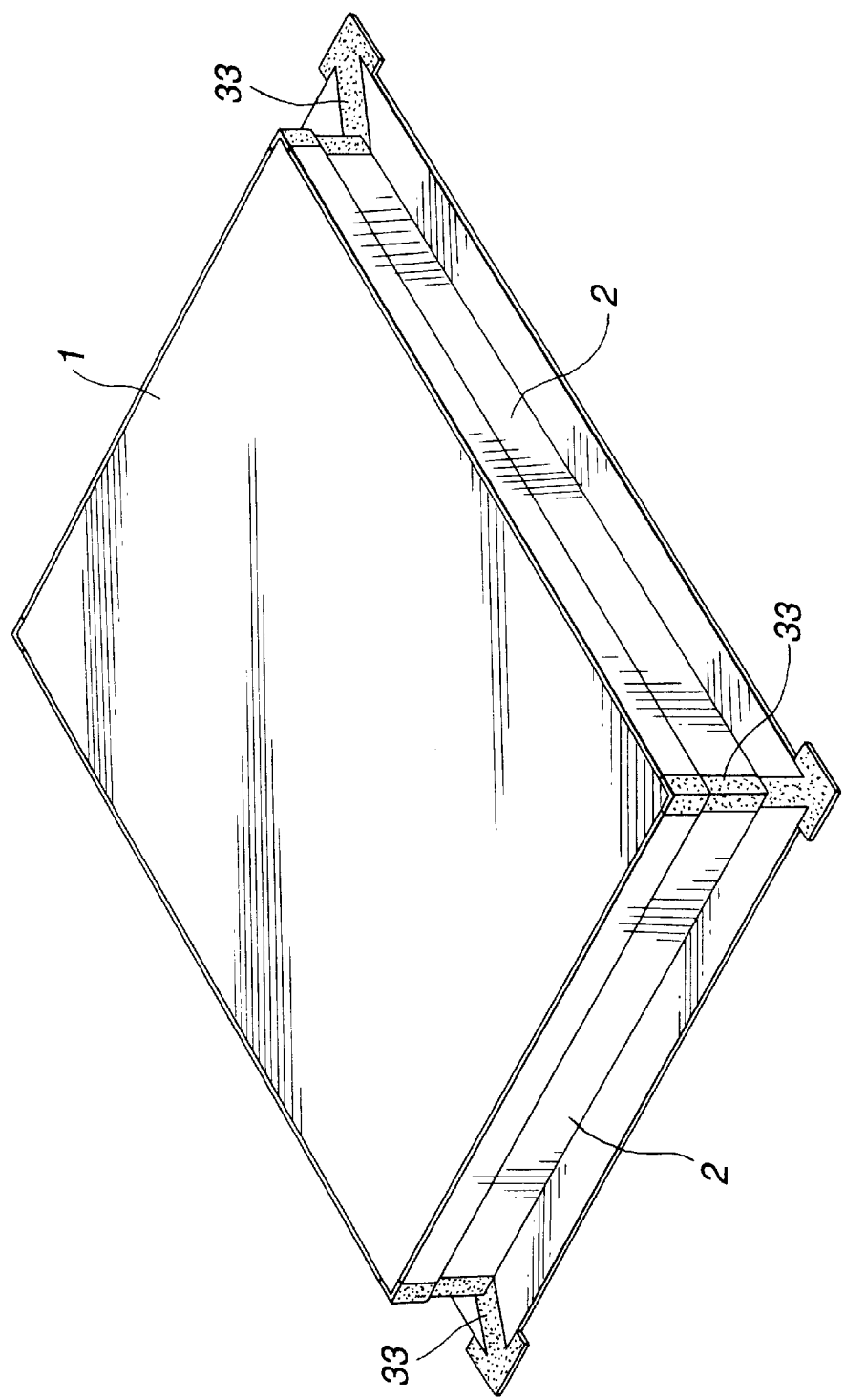
FIG. 8 is a perspective view showing an appearance of a building panel of another embodiment according to the present invention.
Figure 9:
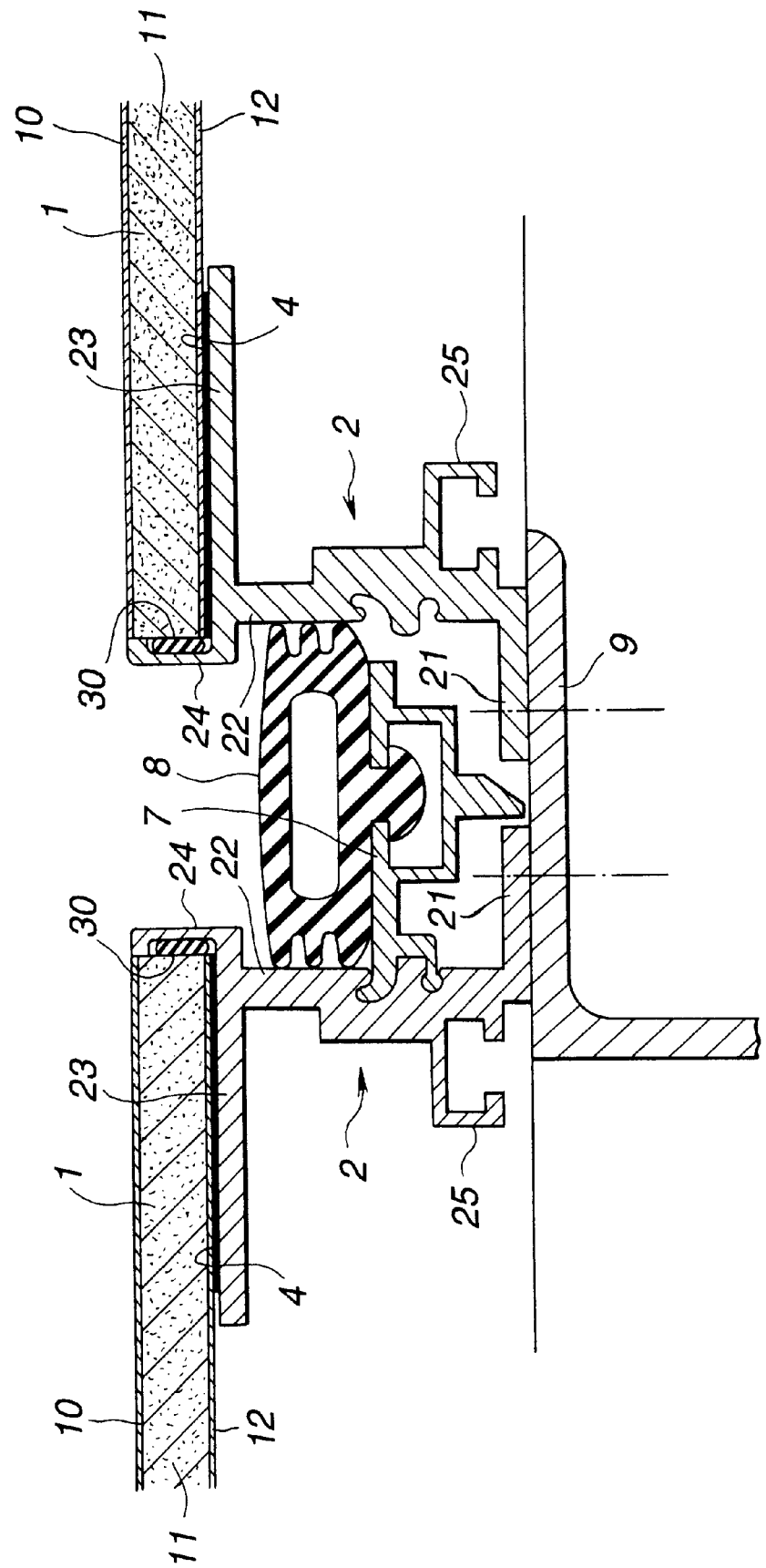
FIG. 9 is a cross sectional view for a main portion showing the structure of the building panel of FIG. 8.

A building panel according to the present invention comprises, as shown in FIG. 8, a panel member 1 shaped into a quadrate planar configuration with a composite plate formed by laminating metal sheets on both surfaces of a synthetic resin sheet, and holding plates 2, 2 as supports each attached in the vicinity of each edge at a rear face of the panel member. As shown in FIG. 9, the holding plate 2 has an engaging portion 21 engaged to a wall surface of a building, a raised portion 22 from the engaging portion and a joined portion 23 secured to a rear face of the panel member 1, in which the joined portion 23 of the holding plate 2 is bonded to the panel member 1 by way of an adhesion layer 4 composed of a self-adhesive, a thermoplastic resin-based or elastomer-based adhesive and clamped at the top end thereof by the rivet 5 of the above-mentioned structure buried at the inside of the panel member.

A composite plate, for example "ALPOLIC" (trade name) described above is used for the panel member and shaped into a quadrate planar configuration. The holding plate 2 is a member for securing the panel member 1 to the building and attached by four in total to each of the sides of the panel member 1. The holding plate 2 is extrusion molded from the same metal material as that for the surface of the panel member 1 for preventing electric corrosion, and for example, formed into a generally Z-shaped configuration at a cross section perpendicular to the longitudinal direction thereof with the engaging portion 21, the raised portion 22 and the joined portion 23 as shown in FIG. 9. The holding plate 2 is disposed in a state that the engaging portion 21 extends outwardly from one side of the panel member 1 in parallel with the panel member, in order that an engaging material such as textiles are inserted to a joint formed between the building panels and secured to the wall surface upon arranging a plurality of such building panels to the wall surface of the building.

The joined portion 23 of the holding plate 2 is bonded to the rear face of the panel member 1 by way of the same adhesive layer 4 as described above comprising the self-adhesive, the thermoplastic resin-based adhesive or elastomer-based adhesive. The adhesion layer 4 bonds the panel member 1 and the joined portion 23 more firmly in cooperation with the rivet 5 and improves water sealing performance between the panel member 1 and the holding plate 2. As the rivet 5, the mandrel-inserting type rivet shown in FIGS. 4 to 6 is used.

In the present invention, the self-adhesive, the thermoplastic resin-based adhesive or elastomer-based adhesive is intervened as the adhesion layer 4, and clamping is applied by the rivet 5, by which the joined portion 23 itself provides a large resistive force to drawing to prevent the deformation of the aluminum sheet in contact with the joined portion 23. As a result, a clamping product having a high drawing strength of the rivet 5 can be obtained.

Further, the holding plate 2 has a covering portion 24 raised from the joined portion 23 for sealing the header of the panel member 1 as shown in FIG. 9. The raised portion 22 of the holding plate 2 is disposed at a position slightly inward of the header (edge) of the panel member 1 in view of loading a gasket 8, etc. to be described layer to the joint formed upon arranging the building panels, and the covering portion 24 is raised from the joined portion 23 extended in an overhanging state to the joint relative to the raised portion 22 and formed to a height corresponding to the thickness of the panel member 1. Since the covering portion 24 of the holding plate 2 covers the header of the panel member 1, it is not only esthetically preferred but also can improve the weather resistance. That is, the covering portion 24 can improve water tightness of the panel member 1 itself and is effective for preventing peeling between the synthetic resin sheet and the aluminum sheet in the panel member 1.

Further, it is preferred that a sealing material 30 is interposed between the covering portion 24 of the holding plate 2 and the header of the panel member 1 for further improving the water tightness of the panel member 1 itself and a water sealing performance between the panel member 1 and the holding plate 2. Then, for fully attaining the effect of the sealing material 30, it is preferred to form a recess of an appropriate depth to the inner surface of the covering portion 24 that abuts against the header of the panel member 1 and insert the sealing member 30 under pressure into the recess.

As the sealing member 30, various kinds of definite or indefinite building sealing materials maybe used. Since the panel member 1 and the covering portion 24 are made of a relatively thin material and have relatively high elasticity, indefinite elastic sealing material is used preferably. Specifically, there can be mentioned, silicones, modified silicones, polysulfides, modified polysulfides, acrylic urethanes and polyurethanes sealing materials, as well as various kinds of synthetic rubbers. In addition, the rubber adhesive can also be used effectively for the sealing material 30.

Figure 10:
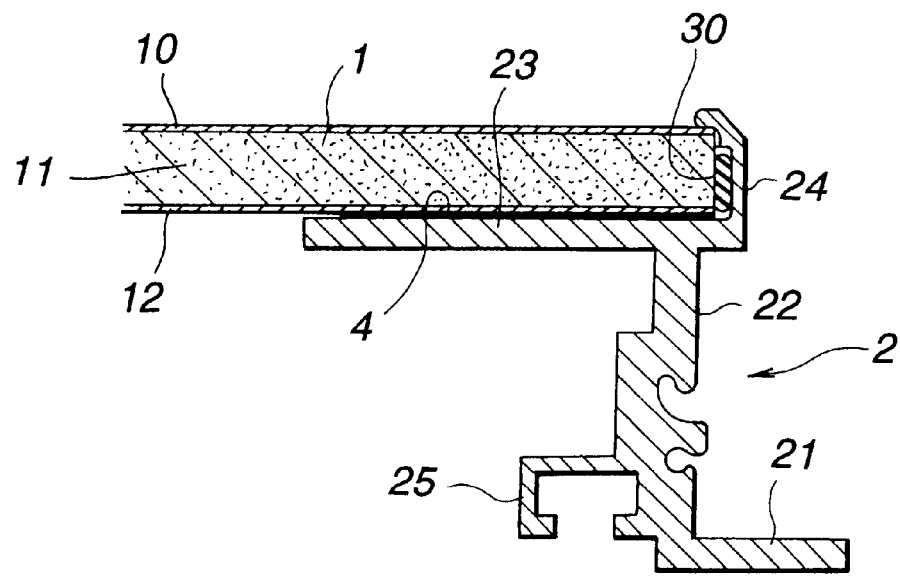
FIG. 10 is a cross sectional view for a main portion showing the structure of the building panel of FIG. 8, which shows another embodiment of a holding plate as a support.
Figure 11:
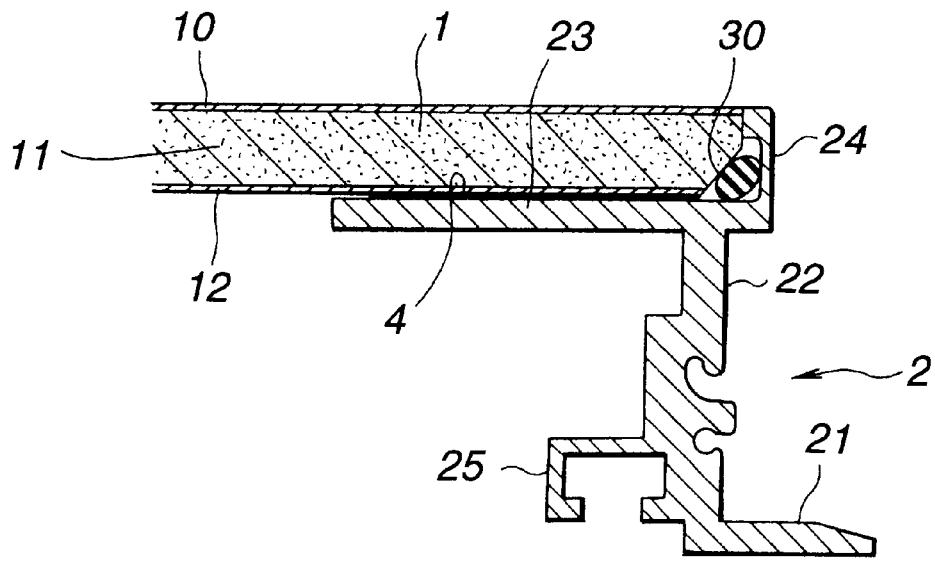
FIG. 11 is a cross sectional view for a main portion showing the structure of the building panel of FIG. 8, which shows another embodiment of a water sealing structure.

The structure of the covering portion 24 or the insertion structure of sealing material 30 in the holding plate 2 may have a structure as shown in FIG. 10 or FIG. 11. The holding plate 2 shown in FIG. 10 has a structure that the upper end edge of the covering portion 24 slightly covers the metal sheet on the surface of the panel member 1 and the covering portion 24 of the such a structure can engage the metal sheet on the surface to supplement adhesion force thereof. Further, the holding plate 2 shown in FIG. 11 is similar with the holding plate shown in FIG. 2, excepting for the difference of the insertion structure of the sealing material 30. That is, in the holding plate 2 shown in FIG. 11, an edge opposing the rear face of the panel member 1 is partially cut out, and a relatively large sealing material 30 is filled with a gap formed at the corner of the covering member 24 and the joined portion 23, thereby improving water tightness to the rear face of the panel member 1.

The building panels of the present invention are arranged in plurality, for example, in a lattice-like configuration as exterior panels on the wall surface of a building. For securing the building panel to the wall surface, the engaging portion 21 of the holding plate 2 as the support is secured to the substrate angle (substrate steel frame) 9 arranged on the surface of a building skeleton by using screws such as of textiles as shown in FIG. 9. Then, a back-up material 7 is inserted in the joint formed between the building panel and other building panel adjacent thereto, and a gasket 8 is inserted to the outside of the back-up material 7.

The joint structure illustrated in FIG. 9 has a structure capable of mounting the back-up material 7 and the gasket 8 extremely easily to the joint. That is, the back-up material 7 has two ridges of engagements each curved at the top end on one side edge along the longitudinal direction, and inserted into the joint by engaging and twisting each of the engagements to two grooves formed in the raised portion 22 of the holding plate 2.

Further, the gasket 8 is made of an elastic material such as synthetic rubber, and has pleats formed on both sides along a longitudinal direction and a row of ridge having a bulged top end formed at the bottom. The gasket 8 is engaged to the back-up material 7 by enforcing the ridge into the slit formed to the surface of the back-up material 7 along the longitudinal direction, and is brought into an intimate contact with the raised portion 22 of each of the holding plates 2, 2 of the adjacent building panels. Accordingly, in the joint structure shown in FIG. 9, the gasket 8 prevents rain water from intruding to the inside of the joint.

In the joint described above, water seal may be applied by placing various kinds of sealing materials in the same manner as in the prior art. Further, as shown in FIG. 9, a gasket attaching rail 25 may be extended below the raised portion 22 in the holding plate 2. The gasket attaching rail 25 forms a groove supporting a gasket made of an elastic material such as synthetic rubber (not illustrated) to the surface of a building skeleton. When the gasket is attached to the gasket attaching rail 25, since the gasket abuts against the surface of the building skeleton in an airtight manner, the joint can be made completely independent of the inside of the building panel. Then, if the inside of the gasket 8 for sealing the joint is properly opened to an atmospheric air, the pressures can be equalized between the inside and the outside of the gasket 8, to further improve the water sealing performance.

Since the building panel described above has a structure of attaching the holding plate 2 to the rear face of the panel member 1 of a quadrate planar configuration, and the panel member can be formed by cutting the composite plate with no bending fabrication or the like, it can be manufactured easily and the shaping accuracy can be improved. Further, since the joined portion 23 of the holding plate 2 is joined to the panel member 1 by means of the specified adhesion layer 4 and further clamped by the rivet 5, a further strong peeling strength is obtained between the panel member 1 and the holding plate 2. Then, the adhesion layer 4 improves the water sealing performance between the panel member 1 and the joined portion 23 of the holding plate 2. Furthermore, since the top end of the rivet 5 for clamping the panel member 1 and the holding plate 2 is buried in the inside of the panel member 1, it does not impair the esthetic appearance of the panel member 1.

In the building panel shown in FIG. 8, an appropriate gap may be disposed to a meeting portion between each of the holding plates 2, 2, . . . corresponding to each of the corners of the panel member 1, and corner members 33, 33 . . . , each made of an elastic material such as synthetic rubber may be attached to such a gap. The corner member 33 is protruded at an arrow-shaped top end by a predetermined size outwardly from the end of the engaging portion 21 of the holding plate 2, thereby extremely facilitating positioning when a plurality of building panels are arranged on the surface of a building skeleton.

Further, in other embodiment of the present invention, the attaching strength of the holding plate to the composite plate is further enhanced by improving the structure of the holding plate in the building panel in which the rivet is applied to the composite plate. That is, the building panel in other embodiment according to the present invention comprises, as shown in FIGS. 12 and 13, a panel member 1 shaped into a quadrate planar configuration with a composite plate formed by laminating metal sheets 10, 12 on both sides of a synthetic resin core sheet 11, and four holding plates 2, 2, . . . as supports each attached along each of the side In the same manner as described above, the holding plate 2 attached, in total by four, along each of the sides of the panel member 1 are formed with the same metal material as that for the metal sheet 12 at the rear face of the panel member 1 and, for example, the holding plate 2 is extrusion molded so as to have a substantially Z-shaped configuration at a cross section perpendicular to the longitudinal direction.

That is, the holding plate 2 mainly comprises an engaging portion 21 engaged to the wall surface of a building, a leg 22 raised from the engaging portion, and a joined portion 23 disposed at the top end of the leg 22 in parallel with the engaging portion 21 and secured to the rear face of the panel member 1. Then, as shown in FIG. 13, the holding plate 2 is attached to the panel member 1 with the engaging portion 21 being extended outward of the panel member 1.

Figure 12:
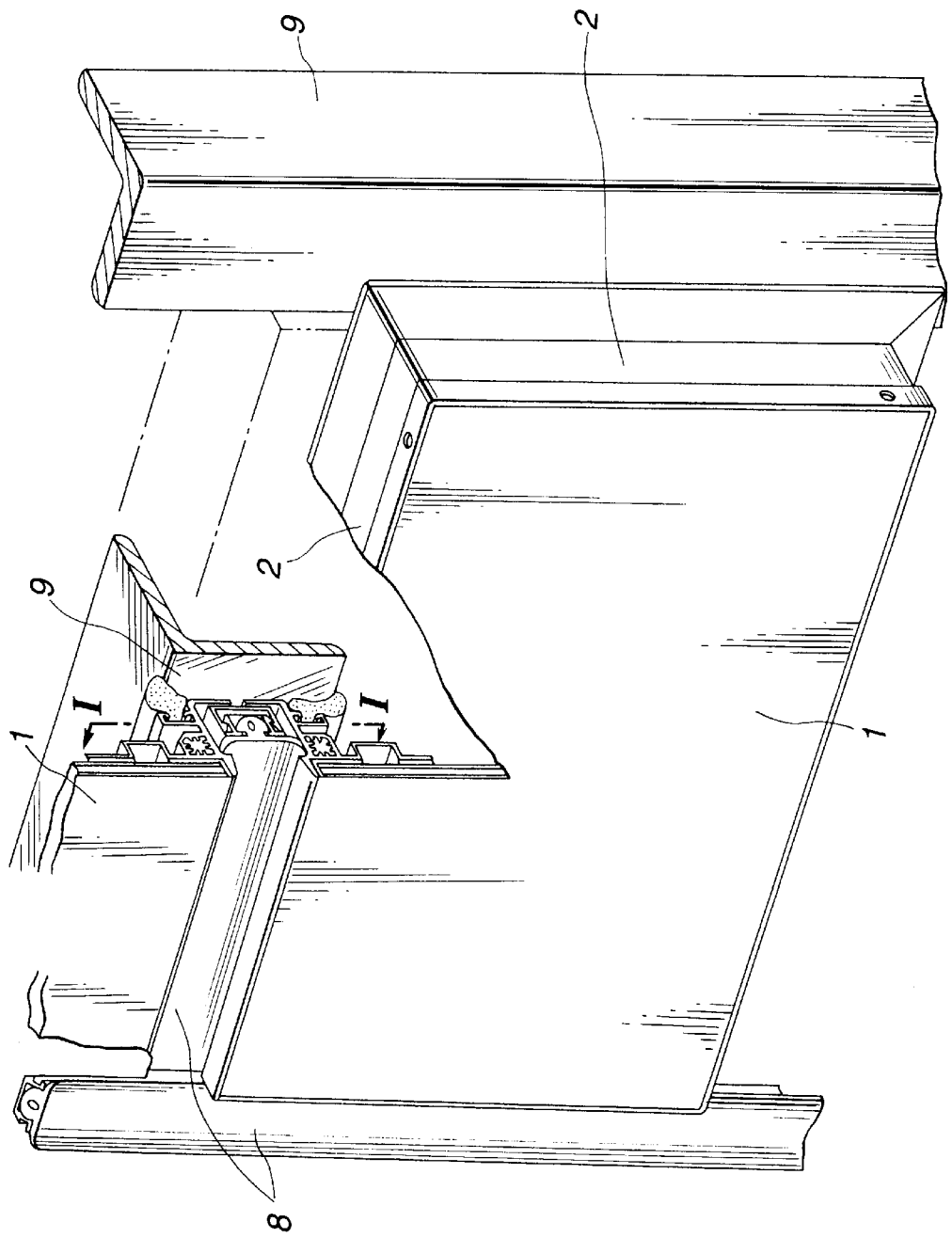
FIG. 12 is a perspective view partially in cross section showing an appearance of a building panel of a further embodiment according to the present invention.
Figure 13:
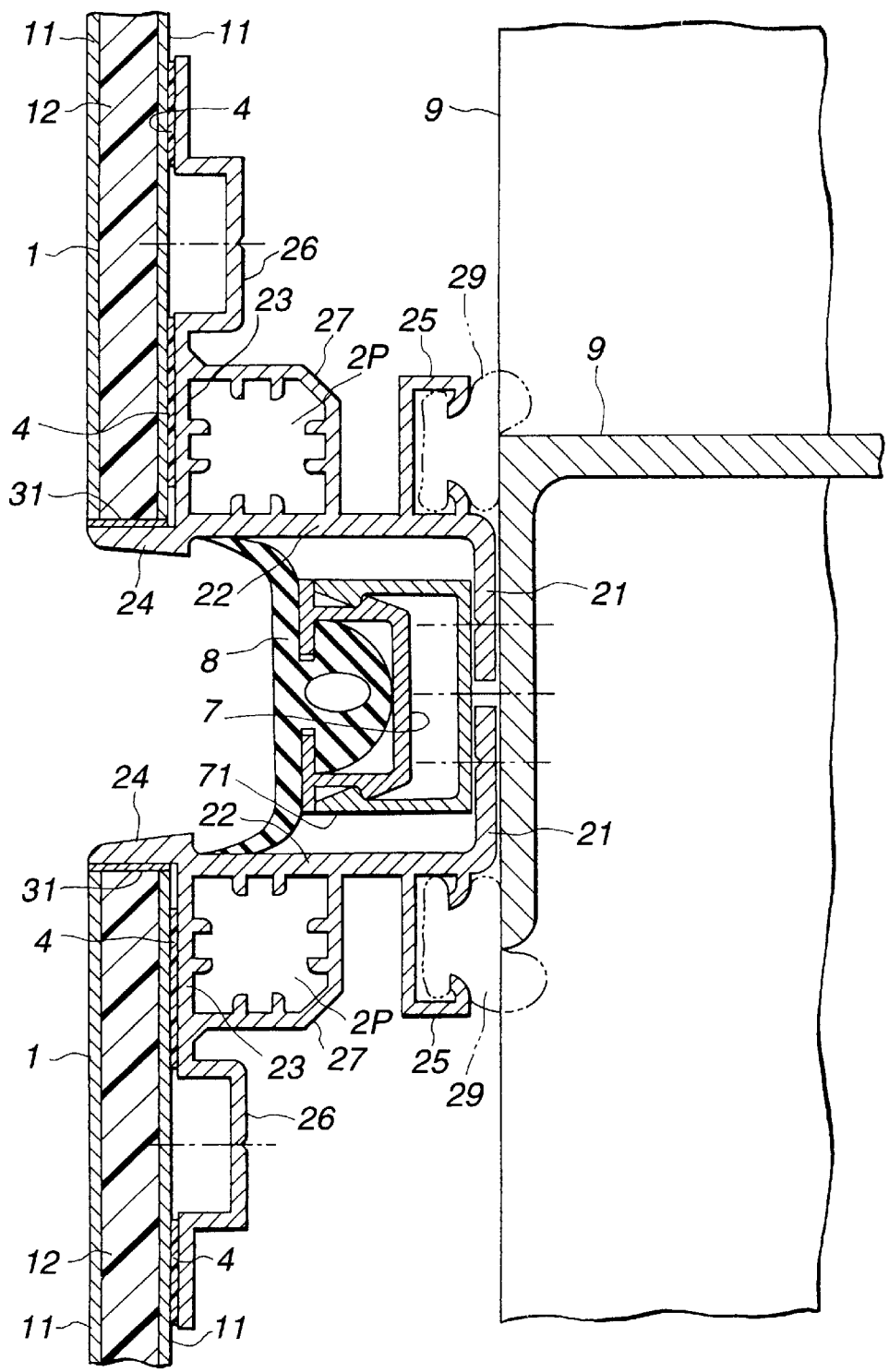
FIG. 13 is a view taken along line I—I in FIG. 12, which is a side elevational cross sectional view showing a structure for a main portion of a building panel according to the present invention.
Figure 14:
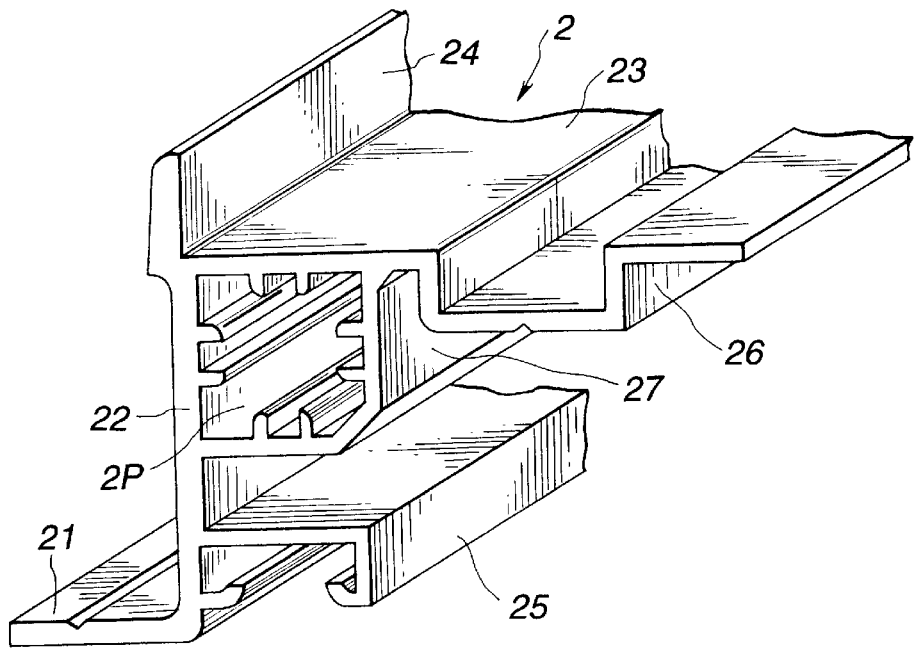
FIG. 14 is a perspective view for a main portion showing the structure of a holding plate as a support for the panel shown in FIG. 12.
Figure 15:
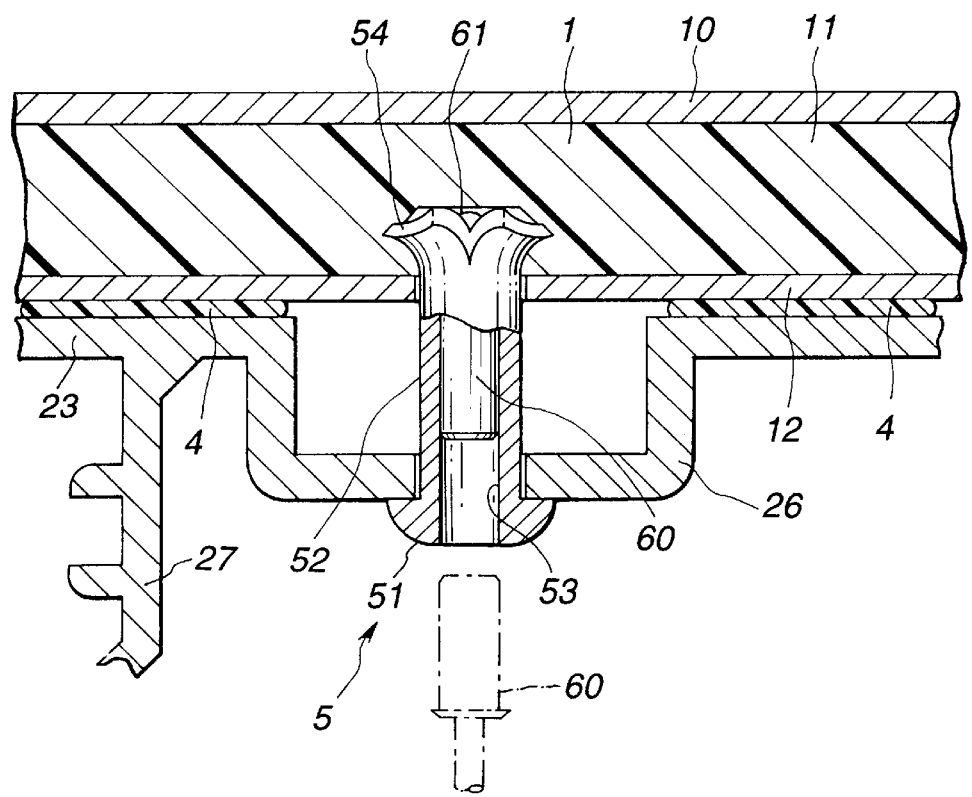
FIG. 15 is a side elevational view partially in cross section for a main portion showing a clamping rivet for a panel member and a holding plate of the panel in FIG. 12.

In the panel shown in FIG. 12, the joined portion 23 of the holding plate 2 has a bridge-shaped bent portion 26 at a portion thereof which is bulged in a direction away from the panel member 1 as shown in FIGS. 13 and 14, and is clamped at the bent portion 26 by using the rivet 5 described above shown in FIG. 15 at a position shown by a broken line in FIG. 13.

In the structure of clamping the panel member 1 and the holding plate 2 by the rivet 5, since the bent portion 26 of the joined portion 23 intervenes elasticitically and at functions like that a spring washer, it is extremely effective to prevent the deformation of the metal sheet 12 at the rear face of the panel member 1 when the rivet 5 is spiked. In addition, when it is used as an outer wall material, and even if an external force should be applied to the panel member 1 in a direction of drawing the rivet 5 and the metal sheet 12 at the rear face deforms to some extent, the rivet 5 can be prevented from loosening and maintain strong clamping force.

Further, the joined portion 23 of the holding plate 2 is clamped to the metal sheet 12 at the rear face of the panel member 1 by means of the same adhesion layer 4 as described above. The adhesion layer 4 cooperates with the rivet 5 to join the panel member 1 and joined portion 23 more firmly and improves the water sealing performance between the panel member 1 and the holding plate 2.

Further, as shown in FIG. 13, the holding plate 2 has a frame 24 raised from the joined portion 23 for sealing the header of the panel member 1. The frame 24 is raised from the end edge of the joined portion 23 in a state overhanging outwardly from the leg 22, that is, toward the joint for forming a groove, so-called gutter, in the joint, and the frame is formed to a height substantially equal with the thickness of the panel member 1. Since the frame 24 covers the header of the core sheet 11 of the panel member 1 it is not only desirable from an aesthetical point of view but also forms a water sealing structure at the header of the panel member 1.

That is, the header of the panel member 1 is sealed by the frame 24 by means of an adhesion layer 31. The adhesive layer 31 comprises the same self-adhesive, the thermoplastic resin-based adhesive or elastomer-based adhesive as that for the adhesion layer 4. For the adhesion layer 31, a self-adhesive tape is used preferably from a view point of handling like that the adhesion layer 4. As a result, in the building panel according to the present invention, the water sealing performance of the panel member itself can be improved, and this is effective to prevent peeling between the core sheet 11 and the metal sheets 10, 12.

As shown in FIG. 14, the holding plate 2 is provided with a reinforcing portion 27 forming a hollow portion 2p at the corner of the leg 22 and the joined portion 23 along the longitudinal direction of the holding plate in order to improve the load endurance of the holding plate while maintaining reduced weight thereof. Then, when four holding plates 2, 2, . . . are attached to four circumferential sides of the panel member 1, they can be assembled extremely conveniently and at a high accuracy by utilizing the hollow portion 2p of the reinforcing portion 27.

Specifically, as shown in FIG. 12, the longitudinal end of the holding plate 2 is cut at an outwardly protruding corner so as to form an angle of 45° in a plan view, and the holding plates 2, 2 adjacent with each other are abutted against each other so as to form a corner at a right angle. In this case, the holding plates 2, 2, . . . can be simply secured temporarily to the panel member 1 by inserting an L-shaped core member bent at 90° (not illustrated) to each of the hollow portions 2p, 2p, . . . at the abutted portion of the adjacent holding plates 2, 2, . . . , so that holding plates 2, 2, . . . can be attached accurately.

In the building panel shown in FIGS. 13 and 14, the engaging portion 21 of the holding plate 2 is secured to the substrate angle (substrate iron frame) 9 arranged on the surface of the building skeleton by using screws such as of textiles in the same manner as in the panel described above (secured at positions shown by dotted lines). Then, aback-up material 7 and a gasket 8 are inserted in the joint formed between the building panel and another adjacent building panel.

The joint structure illustrated in FIG. 13 has a structure capable of mounting the back-up material 7 and the gasket 8 extremely simply and reliably. That is, a trough-shaped receptacle 71 of a length shorter than the placing pitch of the textile for securing the building panel is attached to the joint formed between each of the building panels by means of tapping screws (secured at positions shown by dotted chains). The receptacle 71 has a substantially U-shaped cross section in perpendicular to the longitudinal direction and has protrusions at the inside of each of opening edges for engaging the back-up material 7.

The back-up material 7 has a length extending over a plurality of building panels, and has a substantially U-shaped configuration with such a width as capable of inserting into the receptacle 71, at a cross section perpendicular to the longitudinal direction and has protrusions formed on each of the outer surfaces for engaging the protrusions of the receptacle 71. Accordingly, the back-up material 7 can be attached easily by press-fitting into the receptacles 71, 71 secured in the joint. Then, engagements are formed at each of open side edges of the back-up member 7 in parallel with the bottom of the back-up material for engaging the gasket 8.

The gasket 8 is formed as a tape made of an elastic material such as synthetic rubber in the same manner as described above. The gasket 8 comprises a flat band-shaped portion formed somewhat wider than the width of the joint and a convex portion disposed integrally to the rear face of the band-shaped portion along the longitudinal direction. A recess to which the engagement of the back-up material 7 is fitted is disposed at the base of the convex portion. Accordingly, the gasket can be attached simply by press-fitting the convex portion to the inside of the back-up material 7 secured to the receptacle 71. As shown in FIG. 12, the gasket 8 inserted into the horizontal joint is airtightly bonded to the side edge of the other gasket 8 inserted into a vertical joint by using a sealing material.

The gasket 8 attached as shown in FIG. 13 is brought into an intimate contact at pleat-shaped both side edges with the gutter described above formed to the leg 22 of the holding plate 2. Accordingly, in the joint structure shown in FIG. 13, the gasket 8 prevents rain water from intruding to the inside of the joint, as well as can smoothly discharge rain water flowing on the surface of the panel member 1 and intruding to the horizontal joint to the vertical joint by way of the gutter in the leg 22. Further, in the joint structure described above, the gasket 8 can be positioned easily and free from falling or displacement even fi the gasket 8 is denatured during long time use, to provide high safety to the present invention, water sealing may be applied in the same manner as usual by placing various kinds of sealing materials and gaskets.

Further, as shown in FIG. 13, the gasket attaching rail 25 extended to the holding plate 2 forms a groove for supporting the gasket 29 composed of an elastic material such as synthetic rubber to the surface of a building skeleton. When the gasket 29 is attached, since the gasket 29 is brought into an airtight contact with the surface of the building skeleton (surface of the substrate iron frame 9), the joint can be made completely independent of the inside of the building panel. Then, if the inside of the gasket 8 for sealing the joint is properly opened to the atmospheric air, the pressure can be equalized between the inside and the outside of the gasket 8 to further improve the water sealing performance.

In the building panel shown in FIG. 12, the joined portion 23 has a bridged bent portion 26 and is clamped at the bent portion 26 by the specified rivet 5, in which the bent portion 26 functions like that a spring washer, to prevent the rivet 5 from loosening and maintain strong clamping force. That is, in the building panel of the present invention, since the holding plate 2 has the bent portion 26 for preventing the rivet 5 from loosening and the rivet 5 has a large drawing strength, the attaching strength of the holding plate 2 can be improved further. Further, since the building panel according to the present invention has a structure of separately forming the panel member 1 and the holding plate 2 and clamping them by the rivet 5, it can be manufactured easily, and the panel member 1 can be formed with no bending fabrication and at a high accuracy, to further improve the shaping accuracy.

Further, in the structure of clamping the rivet 5 at the bridged bent portion 26, since cutting dusts upon fabrication for aperturing the rivet hole are discharged to the inner space of the bent portion 26 but not intrude into a portion between the metal sheet 11 at the rear face and the joined portion 23 or lower holes formed to the panel member 1, so that the rivet 5 after assembling can be inserted smoothly and, for example, the rivet can be additionally clamped easily.

Figure 16:
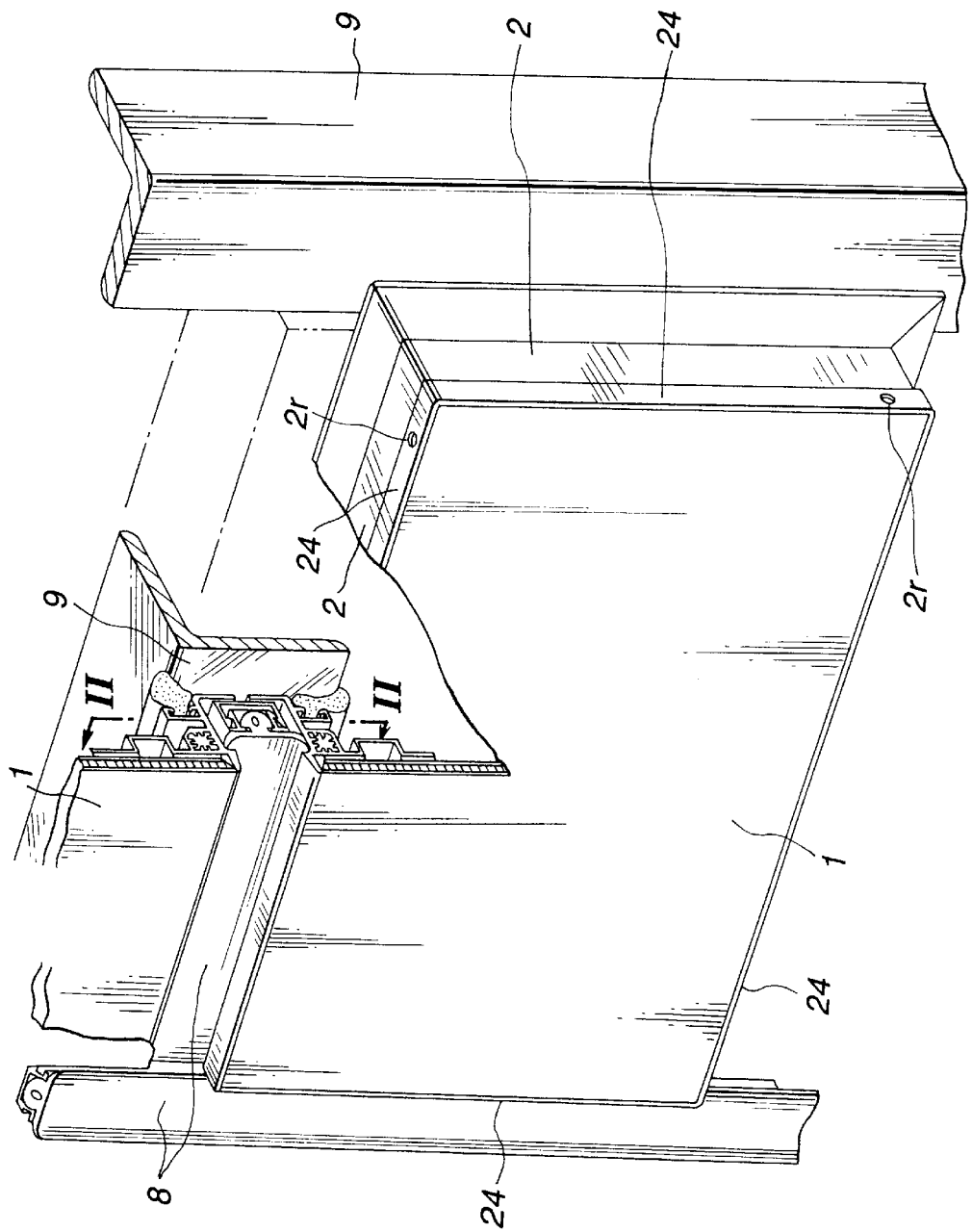
FIG. 16 is a perspective view partially in cross section showing an appearance of a building panel of a further embodiment according to the present invention.
Figure 17:
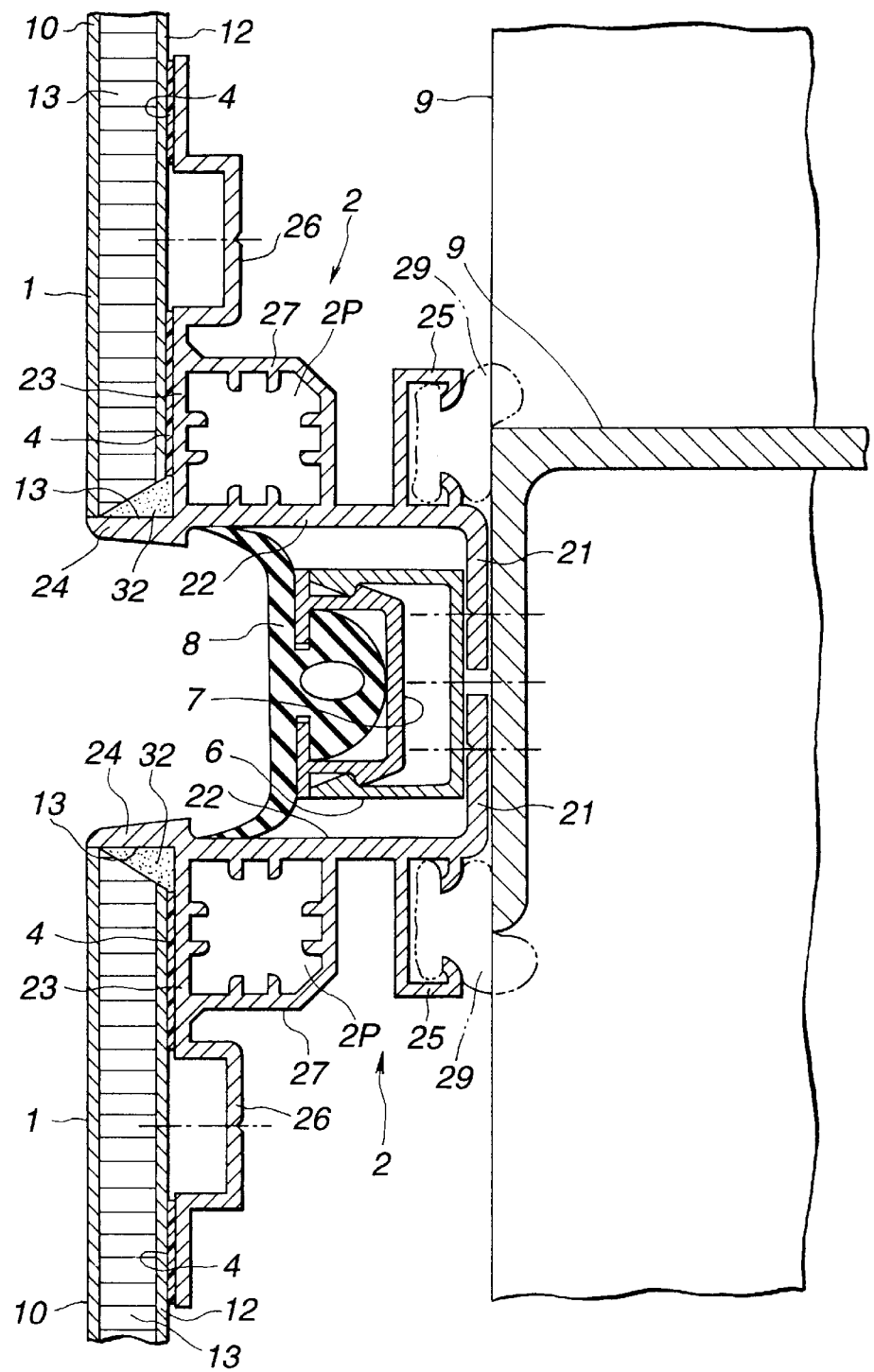
FIG. 17 is a view taken along line II—II in FIG. 16, which is a cross sectional side elevational view showing a structure for a main portion of a building panel according to the present invention.

The present invention is applicable also to a composite plate having a honeycomb core in addition to the composite plate having the core of the synthetic resin sheet. That is, a building panel of a further embodiment according to the present invention comprises, as shown in FIGS. 16 and 17, a panel member 1 shaped into a quadrate planar configuration with a flame retardant composite plate formed by laminating metal sheets 10, 12 on both surfaces of a metal honeycomb core 13, and holding plates 2, 2, . . . as supports each attached along each of the side edges at the rear face of the panel member and having a frame 24 for covering the header of the panel member. The header of the panel member 1 is provided with a recessed shape to form a closed space 13 with the frame 24 of the holding plate 2, 2, . . . , and a sealing material 31 is filled in the space 13.

As the composite plate forming the panel member 1, a honeycomb core 13 made of aluminum reduced in weight and excellent in rigidity and strength is suitable. The aluminum honeycomb core 13 has a structure obtained by laminating strips of aluminum foils, partially bonding them at a predetermined pattern to form a laminate, and then developing such a laminate along the laminating direction, thereby forming a honeycomb configuration having a plurality of hexagonal cells along the developing direction. That is, the core 13 is formed at a plate having a thickness corresponding to the height for each of the cells in the entire outer configuration. The honey-comb core 13 preferably is made of aluminum formed usually to a thickness (cell height) of about 5 to 52 mm and has a so-called apparent core density about from 20 to 90 kg/m$^3$ defined by the thickness of the aluminum foil, cell size or the like.

On the other hand, as the metal sheets 10, 12 laminated on both surfaces of the composite plate, while various kinds of metals such as stainless steel, iron, copper, titanium, tin and nickel or alloys of them may be used, aluminum is used preferably with a view point of reducing the weight. For the metal sheets 10, 12, the thickness of the metal sheet 10 on the surface is about from 0.1 to 2.5 mm, preferably from 1.0 to 2.2 mm, while the thickness of the metal sheet 12 on the rear face is from about 0.1 to 2.0 mm, preferably from 0.5 to 0.8 mm.

The metal sheets 10, 12 are usually disposed being brought into an intimate contact with the honeycomb core 13 by an adhesive. As the adhesive, epoxy, cyanoacrylate or like other adhesive can be mentioned. The adhesive is used usually being laminated as an adhesive film having a thickness of about 200 to 500 μm on the surface of the honey-comb core 13. Further, for improving the flame retardancy of the panel member 1, the metal sheets 10, 12 may be brazed to the honeycomb 13. Brazing is conducted by previously laminating an aluminum brazing material of a lower melting point to the bonding surface between each of the metal sheets 10, 12 and the honeycomb core 13 and hot melting the brazing material in an inert gas atmosphere. As the composite plate, there can be mentioned, for example, ALUMINUM HONEYCOMB PANEL (trade name, manufactured by Mitsubishi Aluminum Co.).

Figure 18:
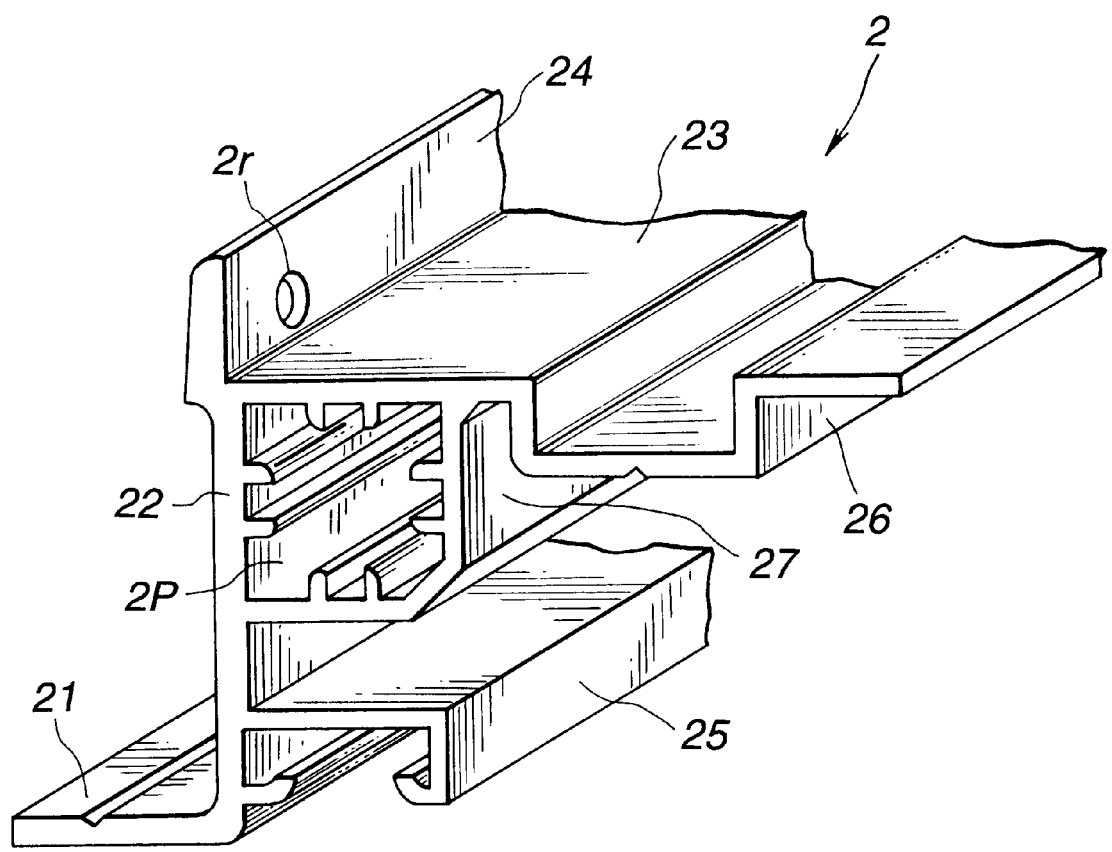
FIG. 18 is a perspective view for a main portion showing a structure of a holding plate as a support for the panel shown in FIG. 16.

The holding plate 2 is the same as that shown in FIG. 13 and attached, in total by four, along each of the sides of the panel member 1. The holding plate 2 is formed with the same metal material as that for the surface of the panel a generally Z-shaped configuration at a cross section perpendicular to the longitudinal direction as shown in FIG. 18. That is, the holding plate 2 mainly comprises an engaging portion 21 engaged to the wall surface of a building material, a leg 22 raised from the engaging portion and a joined portion 23 disposed to the upper end of the leg 22 in parallel with the engaging portion 21 and secured to the rear face of the panel member 1. Then, as shown in FIG. 17, it is attached to the panel member 1 with the engaging portion 21 being extended outwardly of the panel member 1 in order to insert a retaining material such as textiles to the joint formed to the wall surface of the building.

Further, the holding plate 2 shown in FIG. 17 has a frame 24 raised from the joined portion 23 for sealing the header of the panel member 1 in the same manner as shown in FIG. 13. Since the frame 24 covers a header of the panel member 1 at which the honeycomb core 13 is exposed, it is not only preferred from an aesthetical point of view but also constitutes a water sealing structure in cooperation with a specified shape at the header of the panel member 1.

The header of the panel member 1 has a recessed shape to form a closed space 13 with the frame 24 of the holding plates 2, 2, . . . . The concrete shape of the header is, for example, in inclined surface retracting gradually toward the rear face of the panel member, for example, as shown in FIG. 17. Such an inclined surface is formed by recessing the header of the panel member 1 by about 45° before attaching of the holding plates 2, 2, . . . . In this case, for improving the cutting accuracy and ensuring the strength at the edge of the metal sheet 10 on the surface, the honeycomb core 13 and the metal sheet 12 on the rear face are collectively recessed at about 45° leaving the metal sheet 10 on the surface of the panel member 1 by using, for example, an NC machine. Then, a sealing material 32 is filled in the space 13 formed by attaching the holding plates 2, 2, . . . . As a result, the water sealing performance of the panel member 1 itself can be improved, to prevent degradation of the honeycomb core 13 of the panel member 1 and prevent peeling between the honeycomb core 13 and the metal sheets 10, 12.

As the recessed shape at the header of the panel member 1, there can be adopted, in addition to the inclined surface as described above, various shapes capable of forming the space 13 continuously along the header of the panel member 1 and closed with the frame 24, as viewed from an identical cross section with that in FIG. 17, for example, a shape formed by cutting off only the honeycomb core 13 substantially in a semi-circular shape, or a shape formed by cutting off a portion of the honeycomb core 13 including the edge of the metal sheet 12 on the rear face in a quadrate shape or a sector-like shape, although not illustrated.

As the sealing material 32, while various kinds of building sealing materials may be used, indefinite elastic sealing material is used preferably since the panel member 1 is relatively thin and has elasticity. In addition, since the sealing material is filled with no gap to a narrow space 13 between the header of the panel member 1 and the frame 24 of the holding plate 2 after assembling, it is important to use a sealing material having a viscosity at a normal temperature upon filling of about 5,000 to 30,000 ps, preferably, 10,000 to 25,000 ps. The viscosity is such that the sealing material having the viscosity in such a range does not flow out of the abutting portion between each of the holding plates 2, 2, - - - and intrudes thoroughly to a portion of the core of the honeycomb core 13 exposed to the header upon filling.

As the sealing material 32, there can be used, specifically, for example, silicones, modified silicones, polysulfides, modified polysulfides, acrylic urethanes or polyurethanes sealing material. For instance, as the polysulfides sealing material, there can be mentioned "SC-500: MAHATITE polysulfide type sealing material for floor joint SC-500" (trade name, manufactured by Yokohama Rubber Co.).

For filling the sealing material 32, openings 2r of an appropriate size are previously formed to the frame 24 of the holding plate 2 as shown in FIG. 16 and FIG. 17. The openings 2r are disposed to at least two positions in each of the holding plates 2, 2, . . . arranged at circumferential sides of the panel member 1 and function as holes for charging the sealing material 32 and also as holes for discharging the sealing material 32 for confirming the state of injection. That is, the sealing material 32 is filled from one of the openings 2r after attaching the four holding plates 2, 2, . . . to the rear face of the panel member 1.

Upon filling the sealing material 32, while the sealing material 32 partially intrudes also to the inside of the cells on the header of the honeycomb core 13, since the sealing material has a relatively low viscosity as described above and shows less flow resistance upon filling, it flows into the space 13 thoroughly between the header of the panel member 1 and the frame 24. In other words, in a case of using the sealing material having the viscosity specified above for the sealing material 32, the header of the panel 1 at which the honeycomb core 13 is exposed can be sealed easily and reliably. The sealing material 32 discharged from other openings 2r is removed, for example, by a spatula along the side wall of the leg 22.

Further, the holding plate 2 shown in FIG. 18 is provided with a reinforcement 27 for forming a hollow portion 2p like that shown in FIG. 14. In the same manner as described above, the four holding plates 2, 2, . . . can be attached to the four circumferential sides of the panel member 1 extremely conveniently and at a high accuracy by utilizing the hollow portion 2p of the reinforcement 27.

Further, the joined portion 23 of the holding plate 2 is provided with a bent portion 26 as shown in FIGS. 17, 18 in the same manner as described previously, in which the holding plate 2 is joined to the panel member 1 by way of an adhesion layer 4 in the same manner as described above, and clamped at the bent portion 26 by using the rivet as described above. The adhesion layer 4 cooperates with the rivet to bond the panel member 1 and the joined portion 23 more firmly and improve the water sealing performance between the panel member 1 and the holding plate 2. Further, in the structure of clamping the panel member 1 and the holding plate 2 by the rivet 5, since the bent portion 26 of the joined portion 23 intervenes elastically, the rivet 5 can be prevented from loosening and maintaining the strong clamping force in the same manner as described previously.

In the building panel shown in FIG. 16, the engaging portion 21 of the holding plate 2 is secured to the substrate angle (substrate iron frame) 9 arranged on the surface of the building skeleton by using screws such as textiles in the same manner as the panel shown in FIG. 12 (secured at positions shown by dotted chains). Then, a back-up material 7 and a gasket 8 are inserted to a joint formed between the building panel and other adjacent building panel. The joint structure illustrated in FIG. 17 is the same as the joint structure shown in FIG. 13.

The thus attached gasket 8 is brought into an intimate contact at pleat-shaped both side edges with the gutter described above formed to the leg 22 of the holding plate 2. Accordingly, in the joint structure shown in FIG. 17, the gasket 8 can prevent rain water from intruding to the inside of the joint, as well as can smoothly discharge the rain water intruding into the horizontal joint along the surface of the panel member 1 by way of the gutter in the leg 22 to the vertical joint. Further, in such a joint structure, the gasket 8 can be positioned easily and free from the worry of dropping or displacement, to provide high safety, even if the gasket 8 is denatured during long time use.

Figure 19:
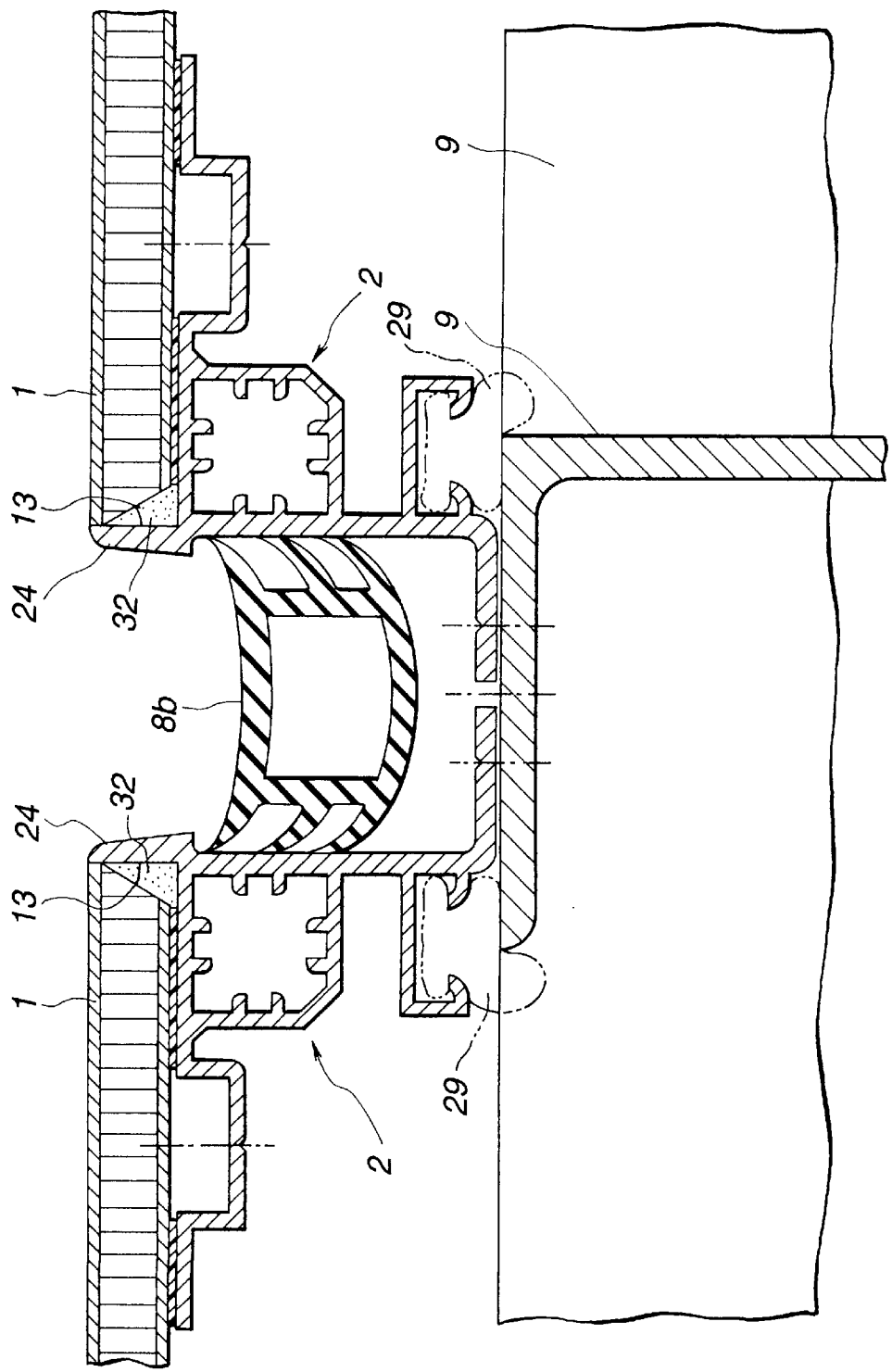
FIG. 19 is a cross sectional side elevational view showing another embodiment of a joint structure using a building panel according to the present invention.

Further, as shown in FIG. 19, a joint structure formed by inserting only a gasket 8b may also be adopted. The gasket 8b shown in FIG. 19 is formed as a tape from an elastic material such as synthetic rubber like that the gasket 8 described above. The gasket 8b has an integral hollow structure comprising two flat layers of a band-shaped portion having a width somewhat larger than that of the joint and pleats disposed between each of the band-shaped portions, which is inserted along the substantially entire depth of the joint and engaged by its resiliency in the joint. Accordingly, it can be applied more easily without using the back-up material or the like.

Further, also shown in FIG. 17, a gasket attaching rail 25 may be extended below the leg 22, and a gasket 29 made of an elastic material such as synthetic rubber may be attached in the holding plate 2.

In the building panel shown in FIG. 16, the sealing material 32 provides the header of the panel member 1 with the water sealing performance. In the structure of attaching the holding plate 2 to the rear face of the panel member 1 shaped into a quadrate planar shape with a flame retardant composite plate formed by laminating the metal sheets 10, 12 on both surfaces of the metal honeycomb core 13, since the panel member 1 can be formed at a high accuracy by cutting the composite plate with no bending fabrication or the like, it can be manufactured easily and the shaping accuracy can be improved.

Further, in accordance with the method of manufacturing the building panel shown in FIG. 16, the building panel comprises the panel member 1 shaped into a quadrate planar shape with a composite plate formed by laminating the metal sheet 10, 12 on both surfaces of the metal honeycomb core 13 and holding plates 2 as the supports each attached along each of the side edges at the rear face of the panel member and having the frame 24 for covering the header of the panel member, in which the header of the panel member 1 has a recessed shape to form the closed space 13 with the frame 24 of the holding plate 2. Since the sealing material 32 having a specified viscosity is filled in the thus formed space 13, the sealing material 32 can be filled with no gap into the space 13 between the header of the panel member 1 and the frame 24, the header of the panel member at which the honeycomb core 13 is exposed can be sealed easily and reliably.

Each of the panel structures according to the present invention is applicable, in addition to the illustrated exterior panels, to various kinds of building panels such as interior panels, shielding panels and decorative panels for buildings, as well as signboards or display boards.

In accordance with the riveting method according to the present invention, there is provided a riveting method between metal sheets, in which the thickness of one of the metal sheets to be clamped being not more than 1 mm, and which is improved such that metal sheets can be clamped at a sufficient strength and the surface of the thin metal plate can be utilized effectively as a decorative surface, and the building panel obtained by the above-mentioned method has an esthetic appearance and can facilitate coating operation.

In accordance with another riveting method of the present invention, there is provided a riveting method for a composite plate formed by adhesion-bonding metal sheets each having a thickness of not more than 1 mm on both surfaces of a synthetic resin sheet having a thickness of 1 to 10 mm, and a metal plate, whereby clamping can be conducted without exposing the rivet end to the surface of one of the metal sheets of the composite plate, while preventing the surface distortion of the metal sheet and at a sufficient clamping strength. Accordingly, the rivet clamping product obtained in accordance with the present invention has an esthetic appearance, enables to utilize the metal sheet surface as the decorative surface, and facilitate the coating operation.

The building panel shown in FIG. 8 is free from the lowering of dimensional accuracy caused by bending fabrication as compared with existent panels formed into flat box-shaped configuration by bending fabrication and, as a result, needs no operation for properly adjusting matching between each of adjacent panel fabrication articles upon attachment, to provide excellent workability. That is, since the building panel shown in FIG. 8 has a structure of attaching holding plates to the rear face of a quadrate planar panel member in which the panel member can be formed by cutting the composite plate with no bending fabrication or the like, manufacture is easy and the shaping accuracy can be improved. In addition, since it has a structure of bonding the joined portion of the holding plate to the panel member by way of a specified adhesion layer and, in addition, clamping it by the specified rivet, it can provide further larger peeling strength between the panel member and the holding plate. Then, water sealing performance between the panel member and the holding plate can be improved by the adhesion layer for bonding the panel member and the holding plate.

According to the building panel of the present invention shown in FIG. 12, the attaching structure of the holding plate can be simplified to reduce the cost, as compared with existent panels of clamping the panel member and the holding plate by stud bolts welded to the rear face of the panel member for instance. Then, in the building panel according to the present invention shown in FIG. 12, since the holding plate has a bent portion for preventing the rivet from loosening and the rivet has large resistance to drawing, the attaching strength of the holding plate can be improved further. Further, since it has a structure of forming the panel member and the holding plate separately and clamping them by the rivet, the panel member can be manufactured extremely easily and formed at a high accuracy to improve the shaping accuracy.

According to the building panel of the present invention shown in FIG. 16, as compared with an existent panel formed by backing the flat box-shaped body obtained by bending fabrication of the metal sheet with the honeycomb core, since the panel member can be formed at a high accuracy by merely cutting the composite plate using the metal honeycomb for the core material with no bending fabrication, the panel member can be manufactured easily and the shaping accuracy thereof can be improved.

What is claimed is:

1. A building panel comprising:
   a panel member being shaped into a quadrate planar configuration having sides, a front face and a rear face;
   wherein the panel member includes a composite plate formed by laminating metal sheets on two opposing sides of a synthetic resin sheet, an outer surface of each metal sheet forming each of the panel member front and rear faces;

a plurality of holding plates, one holding plate for each of the panel member sides, each of the plurality of holding plates including:
  a securing portion that is secured to a structural member of a building,
  a joined portion,
  a raised portion interconnecting the securing and joined portions, and
  a covering portion extending outwardly from the joined portion;
wherein the joined portion of said each of the plurality of holding plates is mechanically and adhesively secured to the panel member rear face in a vicinity of an edge of one of the panel member sides;
wherein the joined portion of said each of the plurality of holding plates includes, at a portion thereof, leg members being spaced from each other and an interconnecting segment being connected and at an angle with respect to the leg members, where the leg members extend at an angle from the panel member rear face such that the interconnecting segment is spaced from the panel member rear face when the joined portion is adhesively and mechanically secured to the panel member rear face;
wherein the adhesive for adhesively securing the jointed portion of said each of the plurality of holding plates is one of a self-adhesive, a thermo-plastic resin-based adhesive and an elastomer-based adhesive;
wherein the joined portion of said each of the plurality of holding plates is mechanically secured to the panel member by means of a rivet that extends between the interconnecting segment and the panel member rear face, where a top end of the rivet is buried in an inside portion of the panel member; and
wherein the covering portion of said each of the plurality of holding plates is configured to seal said one of the panel member sides when the joined portion of said each of the plurality of holding plates is mechanically and adhesively secured to the panel member.

2. A building panel according to claim 1, wherein the metal sheets each have a thickness in the range of 0.2 to 1.0 mm, wherein the synthetic resin sheet is adhesion-bonded between the metal sheets wherein a head of the rivet is disposed at a surface of the interconnecting segment and wherein the top end of the rivet is buried in the synthetic resin sheet.

3. A building panel according to claim 1, further comprising a sealing material, wherein the sealing material is disposed between the covering portion of said each of the plurality of holding plates and said one of the panel member sides.

4. A building panel according to claim 1, wherein a head of the rivet is disposed at a surface of the interconnecting segment.

5. A building panel according to claim 1, wherein the leg members and the interconnecting segment of the joined portion of said each of the plurality of holding plates forms a U-shaped structure that traverses the panel member rear face along the edge of said one of the panel member sides.

6. The building panel according to claim 1, wherein the covering portion of said each of the plurality of holding plates is proximate the edge of said one of the panel member sides.

7. The building panel according to claim 1, wherein an end of the covered portion is proximate the panel member front face when the joined portion of said each of the plurality of holding plates is mechanically and adhesively secured to the panel member.

8. The building panel according to claim 1, wherein one of the plurality of holding plates is mechanically and adhesively secured to the panel member rear face for each side of the panel member.

9. The building panel according to claim 1, wherein the covered portion includes a side sealing portion that is proximate to said one of the panel member sides and extends substantially between the panel front and rear faces when the joined portion of said each of the plurality of holding plates is mechanically and adhesively secured to the panel member.

10. The building panel according to claim 8, further comprising a sealing material, wherein the sealing material is disposed between the side sealing portion and said one of the panel member sides.

11. A building panel in combination with a structural frame for a building, said building panel comprising:
  a panel member being shaped into a quadrate planar configuration having sides, a front face and a rear face;
  wherein the panel member includes a composite plate formed by laminating metal sheets on two opposing sides of a synthetic resin sheet, an outer surface of each metal sheet forming each of the panel member front and rear faces;
  a plurality of holding plates, one holding plate for each of the panel member sides, each of the plurality of holding plates including:
    a securing portion that is configured so as to be secured to a member of the structural frame,
    a joined portion,
    a raised portion interconnecting the securing and joined portions, and
    a covering portion extending outwardly from the joined portion;
  wherein the jointed portion of said each of the plurality of holding plates is mechanically and adhesively secured to the panel member rear face in a vicinity of an edge of one of the panel member sides;
  wherein the joined portion of said each of the plurality of holding plates includes, at a portion thereof, leg members being spaced from each other and an interconnecting segment being connected and at an angle with respect to the leg members, where the leg members extend at an angle from the panel member rear face such that the interconnecting segment is spaced from the panel member rear face when the joined portion is adhesively and mechanically secured to the panel member rear face;
  wherein the adhesive for adhesively securing the joined portion of said each of the plurality of holding plates is one of a self-adhesive, a thermo-elastic resin-based adhesive and an elastomer-based adhesive;
  wherein the joined portion of said each of the plurality of holding plates is mechanically secured to the panel member by means of a rivet that extends between the interconnecting segment and the panel member rear face, where a top end of the rivet is buried in an inside portion of the panel member; and
  wherein the covering portion of said each of the plurality of holding plates is configured to seal said one of the panel member sides when the joined portion of said each of the plurality of holding plates is mechanically and adhesively secured to the panel member.

12. The building panel in combination with the structural frame for the building according to claim 11, wherein the metal sheets each have a thickness in the range of 0.2 to 1.0 mm, where the synthetic resin sheet is adhesion-bonded between the metal sheets wherein a head of the rivet is disposed at a surface of the interconnecting segment and wherein the top end of the rivet is buried in the synthetic resin sheet.

13. The building panel in combination with the structural frame for the building according to claim 11, further comprising a sealing material, wherein the sealing material is disposed between the covering portion of said each of the plurality of holding plates and said one of the panel member sides.

14. The building panel in combination with the structural frame for the building according to claim 11, wherein a head of the rivet is disposed at a surface of the interconnecting segment.

15. The building panel in combination with the structural frame for the building according to claim 11, wherein the leg members and the interconnecting segment of the joined portion of said each of the plurality of holding plates forms a U-shaped structure that traverses the panel member rear face along the edge of said one of the panel member sides.

16. The building panel in combination with the structural frame for the building according to claim 11, wherein the covering portion of said each of the plurality of holding plates is proximate the edge of said one of the panel member sides.

17. The building panel in combination with the structural frame for the building according to claim 11, wherein an end of the covered portion is proximate the panel member front face when the joined portion of said each of the plurality of holding plates is mechanically and adhesively secured to the panel member.

18. The building panel in combination with the structural frame for the building according to claim 11, wherein one of the plurality of holding plates is mechanically and adhesively secured to the panel member rear face for each side of the panel member.

19. The building panel in combination with the structural frame for the building according to claim 11, wherein the covered portion includes a side sealing portion that is proximate to said one of the panel member sides and extends substantially between the panel front and rear faces when the joined portion of said each of the plurality of holding plates is mechanically and adhesively secured to the panel member.

20. The building panel in combination with the structural frame for the building according to claim 19, further comprising a sealing material, wherein the sealing material is disposed between the side sealing portion and said one of the panel member sides.

21. A building panel system comprising at least one building panel, each building panel including:
   a panel member being shaped into a quadrate planar configuration having sides, a front face and a rear face;
   wherein the panel member includes a composite plate formed by laminating metal sheets on two opposing sides of a synthetic resin sheet, an outer surface of each metal sheet forming each of the panel member front and rear faces;
   a plurality of holding plates, one holding plate for each of the panel member sides, each of the plurality of holding plates including:
      a securing portion that is secured to a structural member of a building,
      a joined portion,
      a raised portion interconnecting the securing and joined portions, and
      a covering portion extending outwardly from the joined portion;
   wherein the joined portion of said each of the plurality of holding plate is mechanically and adhesively secured to the panel member rear face in a vicinity of an edge of one of the panel member sides;
   wherein the joined portion of said each of the plurality of holding plates includes, at a portion thereof, leg members being spaced from each other and an interconnecting segment being connected and at an angle with respect to the leg members, where the leg members extend at an angle from the panel member rear face such tat the interconnecting segment is spaced from the panel member rear face when the joined portion is adhesively and mechanically secured to the panel member rear face;
   wherein the adhesive for adhesively securing the joined portion of said each of the plurality of holding plates is one of a self-adhesive, a thermo-plastic resin-based adhesive and an elastomer-based adhesive;
   wherein the joined portion of said each of the plurality of holding plates is mechanically secured to the panel member by means of a rivet that extends between the interconnecting segment and the panel member rear face, where a top end of the rivet is buried in an inside portion of the panel member; and
   wherein the covering portion of said each of the plurality of holding plates is configured to seal one of the panel member sides when the joined portion of said each of the plurality of holding plates is mechanically and adhesively secured to the panel member.

22. A building panel system according to claim 21, wherein the metal sheets each have a thickness in the range of 0.2 to 1.0 mm, wherein the synthetic resin sheet is adhesion-bonded between the metal sheets, wherein a head of the rivet is disposed at a surface of the interconnecting segment and wherein the top end of the rivet is buried in the synthetic resin sheet.

23. A building panel system according to claim 21, further comprising a sealing material, wherein the sealing material is disposed between the covering portion of said each of the plurality of holding plates and said one of the panel member sides.

24. A building panel system according to claim 21, wherein a head of the rivet is disposed at a surface of the interconnecting segment.

25. A building panel system according to claim 21, further comprising a plurality of building panels being arranged and being secured to the structural frame so each building panel forms an exterior panel on a wall surface of the building.

26. A building system according to claim 25, further comprising a joint sealer that is inserted into a joint formed between two adjacent building panels of said plurality of building panels when secured to the structural frame.

27. The building panel system according to claim 21, wherein the leg members and the interconnecting segment of the joined portion of said each of the plurality of holding plates forms a U-shaped structure that traverses the panel member rear face along the edge of said one of the panel member sides.

28. The building panel system according to claim 21, wherein the covering portion of said each of the plurality of holding plates is proximate the edge of said one of the panel member sides.

29. The building panel system according to claim 21, wherein an end of the covered portion is proximate the panel member front face when the joined portion of said each of the plurality of holding plates is mechanically and adhesively secured to the panel member.

30. The building panel system according to claim 21, wherein one of the plurality of holding plates is mechanically and adhesively secured to the panel member rear face for each side of the panel member.

31. The building panel system according to claim 21, wherein the covered portion includes a side sealing portion that is proximate to said one of the panel member sides and extends substantially between the panel front and rear faces when the joined portion of said each of the plurality of holding plates is mechanically and adhesively secured to the panel member.

32. The building panel system according to claim 31, further comprising a sealing material, wherein the sealing material is disposed between the side sealing portion and said one of the panel member sides.

33. A building panel comprising:
   a panel member being shaped into a quadrate planar configuration having sides, a front face and a rear face;
   wherein the panel member includes a composite plate formed by laminating metal sheets on two opposing sides of a synthetic resin sheet, an outer surface of each metal sheet forming each of the panel member front and rear faces;
   a plurality of holding plates, one holding plate for each of the panel member sides, each of the plurality of holding plates including:
      a securing portion that is secured to a structural member of a building,
      a joined portion including at a portion thereof a U-shaped member,
      a raised portion interconnecting the securing and joined portions, and
      a covering portion extending outwardly from the joined portion;
   wherein the joined portion of said each of the plurality of holding plates is mechanically and adhesively secured to the panel member rear face in a vicinity of an edge of one of the panel member sides so that one of the plurality of holding plates is mechanically and adhesively secured to the panel member rear face at each of the panel member sides;
   wherein the joined portion of said each of the plurality of holding plates, when adhesively and mechanically secured to the panel member rear face, is arranged so the U-shaped member extends from the panel member rear face such that an interconnecting segment of the U-shaped member is spaced from the panel member rear face and so the U-shaped member traverses the panel member rear face along each of said one of the panel member sides;
   wherein the adhesive for adhesively securing the joined portion of said each of the plurality of holding plates is one of a self-adhesive, a thermo-plastic resin-based adhesive and an elastomer-based adhesive;
   wherein the joined portion of said each of the plurality of holding plates is mechanically secured to the panel member by means of a rivet that extends between the interconnecting segment of the U-shaped member and the panel member rear face, where a top end of the rivet is buried in an inside portion of the panel member; and
   wherein the covering portion of said each of the plurality of holding plates is configured so a segment thereof is proximate to said one of the panel member sides and extends substantially between the panel member front and rear faces when the joined portion of said each of the plurality of holding plates is mechanically and adhesively secured to the panel member.

34. A building panel in combination with a structural frame for a building, said building panel comprising:
   a panel member being shaped into a quadrate planar configuration having sides, a front face and a rear face;
   wherein the panel member includes a composite plate formed by laminating metal sheets on two opposing sides of a synthetic resin sheet, an outer surface of each metal sheet forming each of the panel member front and rear faces;
   a plurality of holding plates, one holding plate for each of the panel member sides, each of the plurality of holding plates including:
      a securing portion that is configured so as to be secured to a member of the structural frame,
      a joined portion including at a portion thereof a U-shaped member,
      a raised portion interconnecting the securing a joined portions, and
      a covering portion extending outwardly from the joined portion;
   wherein the joined portion of said each of the plurality of holding plates is mechanically and adhesively secured to the panel member rear face in a vicinity of an edge of one of the panel member sides so that one of the plurality of holding plates is mechanically and adhesively secured to the panel member rear face at each of the panel member sides;
   wherein the joined portion of said each of the plurality of holding plates, when adhesively and mechanically secured to the panel member rear face, is arranged so the U-shaped member extends from the panel member rear face such that an interconnecting segment of the U-shaped member is spaced from the panel member rear face and so the U-shaped member traverses the panel member rear face along each of said one of the panel member sides;
   wherein the adhesive for adhesively securing the joined portion of said each of the plurality of holding plates is one of a self-adhesive, a thermo-plastic resin-based adhesive and an elastomer-based adhesive;
   wherein the joined portion of said each of the plurality of holding plates is mechanically secured to the panel member by means of a rivet that extends between the interconnecting segment of the U-shaped member and the panel member rear face, where a top end of the rivet is buried in an inside portion of the panel member; and
   wherein the covering portion of said each of the plurality of holding plates is configured so a segment thereof is proximate to said one of the panel member sides and extends substantially between the panel member front and rear faces when the joined portion of said each of the plurality of holding plates is mechanically and adhesively secured to the panel member.

35. A building panel system comprising at least one building panel, each building panel including:
   a panel member being shaped into a quadrate planar configuration having sides, a front face and a rear face;
   wherein the panel member includes a composite plate formed by laminating metal sheets on two opposing sides of a synthetic resin sheet, an outer surface of each metal sheet forming each of the panel member front and rear faces;

a plurality of holding plates, one holding plate for each of the panel member sides, each of the plurality of holding plates including:
- a securing portion that is secured to a structural member of a building,
- a joined portion including at a portion thereof a U-shaped member,
- a raised portion interconnecting the securing and joined portions, and
- a covering portion extending outwardly from the joined portion;

wherein the joined portion of said each of the plurality of holding plates is mechanically and adhesively secured to the panel member rear face in a vicinity of an edge of one of the panel member sides so that one of the plurality of holding plates is mechanically and adhesively secured to the panel member rear face at each of the panel member sides;

wherein the joined portion of said each of the plurality of holding plates, when adhesively and mechanically secured to the panel member rear face, is arranged so the U-shaped member extends from the panel member rear face such that an interconnecting segment of the U-shaped member is spaced from the panel member rear face and so the U-shaped member traverses the panel member rear face along each of said one of the panel member sides;

wherein the adhesive for adhesively securing the joined portion of said each of the plurality of holding plates is one of a self-adhesive, a thermo-plastic resin-based adhesive and an elastomer-based adhesive;

wherein the joined portion of said each of the plurality of holding plates is mechanically secured to the panel member by means of a rivet that extends between the interconnecting segment of the U-shaped member and the panel member rear face, where a top end of the rivet is buried in an inside portion of the panel member; and wherein the covering portion of said each of the plurality of holding plates is configured so a segment thereof is proximate to said one of the panel member sides and extends substantially between the panel member front and rear faces when the joined portion of said each of the plurality of holding plates is mechanically and adhesively secured to the panel member.

* * * * *

UNITED STATES PATENT AND TRADEMARK OFFICE
CERTIFICATE OF CORRECTION

PATENT NO.    : 6,138,419
DATED         : October 31, 2000
INVENTOR(S)   : Takamasa Sekiguchi et al.

Page 1 of 1

It is certified that error appears in the above-identified patent and that said Letters Patent is hereby corrected as shown below:

<u>Title page,</u>
Item 30, Foreign Application Priority Data
  replace "February 27, 1994 [JP] Japan.............. 7-063359"
  with   -- February 27, 1995 [JP] Japan.............. 7-063359 --.

Signed and Sealed this

Eleventh Day of September, 2001

*Attest:*

*Attesting Officer*

NICHOLAS P. GODICI
*Acting Director of the United States Patent and Trademark Office*